(12) United States Patent
Motoyoshi et al.

(10) Patent No.: US 7,983,351 B2
(45) Date of Patent: Jul. 19, 2011

(54) COMMUNICATION APPARATUS AND RADIO COMMUNICATION SYSTEM

(75) Inventors: Katsuyuki Motoyoshi, Tokyo (JP); Yasuhiro Yano, Tokyo (JP); Hiroshi Kubo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 769 days.

(21) Appl. No.: 11/921,933

(22) PCT Filed: Aug. 2, 2005

(86) PCT No.: PCT/JP2005/014098
§ 371 (c)(1),
(2), (4) Date: Dec. 11, 2007

(87) PCT Pub. No.: WO2007/015292
PCT Pub. Date: Feb. 8, 2007

(65) Prior Publication Data
US 2009/0092198 A1    Apr. 9, 2009

(51) Int. Cl.
*H04L 27/28* (2006.01)
(52) U.S. Cl. ......... 375/260; 375/259; 375/267; 455/59; 370/332; 370/333; 370/342
(58) Field of Classification Search .............. 375/260, 375/259; 455/59
See application file for complete search history.

(56) References Cited

U.S. PATENT DOCUMENTS

| | | | | |
|---|---|---|---|---|
| 2002/0191535 | A1* | 12/2002 | Sugiyama et al. | 370/208 |
| 2003/0137955 | A1* | 7/2003 | Kim et al. | 370/332 |
| 2004/0178954 | A1* | 9/2004 | Vook et al. | 342/383 |
| 2004/0203476 | A1 | 10/2004 | Liu et al. | |
| 2005/0128993 | A1* | 6/2005 | Yu et al. | 370/342 |
| 2007/0140102 | A1* | 6/2007 | Oh et al. | 370/208 |
| 2007/0177681 | A1 | 8/2007 | Choi et al. | |

FOREIGN PATENT DOCUMENTS

| | | |
|---|---|---|
| JP | 2003-87070 A | 3/2003 |
| JP | 2003-169036 A | 6/2003 |

(Continued)

OTHER PUBLICATIONS

Ntt DoCoMo, "Physical Channels and Multiplexing in Evolved UTRA Downlink", 3rd Generation Partnership Project (3GPP), Mobile Compentence Centre, Jun. 20-21, 2005, pp. 1-24, Agenda Item: 4.1, Sophia Antipolis, France.

(Continued)

*Primary Examiner* — Kenneth Lam
(74) *Attorney, Agent, or Firm* — Birch, Stewart, Kolasch & Birch, LLP.

(57) ABSTRACT

A communication apparatus includes a grouping controlling unit hierarchically groups frequency channels so that the number of channels included in a group of a layer becomes smaller than the number of channels included in a group of a layer immediately above; and a propagation path information estimating unit that estimates propagation path information of the channels. The apparatus also includes an average value calculating unit that calculates an average value of the propagation path information for each group in a highest layer with the estimate values, and calculates the estimate values used in each layer based on an average value of a layer immediately above to calculate an average value of the propagation path information for each group in other layers with the estimate values of the each layer; and a feedback unit that feeds back an average value acquired in each group as feedback information.

25 Claims, 15 Drawing Sheets

FOREIGN PATENT DOCUMENTS

| | | |
|---|---|---|
| JP | 2003-530010 A | 10/2003 |
| JP | 2004-104293 A | 4/2004 |
| JP | 2005-502223 A | 1/2005 |
| JP | 2007-517455 | 6/2007 |

OTHER PUBLICATIONS

Seokhyun Yoon et al., "Orthogonal Frequency Division Multiple Access With an Aggregated Sub-channel Structure and Statistical Channel Quality Measurement", 2004 IEEE 60th Vehicular Technology Conference, Sep. 26-29, 2004, pp. 1023-1027, vol. 2, Chapter II, Los Angeles, California, USA.

Samsung, Group-wise Antenna Selective Transmit Diversity in OFDM Systems:, 3rd Generation Partnership Project (3GPP), Mobile Competence Centre, Aug. 22, 2003, pp. 1-7, vol., RAN WG1, Sophia-Antipolis Cedex, France.

3GPP, "Technical Specification Group Radio Access Network; HSDPA Enhancements (Release 6)", 3GPP Generation Partnership Project, Jun. 1, 2003, pp. 1-20, vol. 1.0, 3GPP Organizational Partners, Sophia Antipolis, France.

Baba et al., "A Study on Block Controlled Multilevel Transmit Power Control Scheme using Carrier hole Control Technique for OFDM based Adaptive Modulation Scheme". Jan. 9, 2004, vol. 103, No. 553, pp. 11 to 16.

Teng et al., "Grouping Adaptive Modulation Method for Burst Mode OFDM Transmission System". Aug. 31, 2001, vol. 101, No. 280, pp. 51 to 57.

'Initial Measurement on MIMO Eigenmode Communication System' Sep. 2004, vol. J87-B No. 9.

* cited by examiner

COMMUNICATION APPARATUS AND RADIO COMMUNICATION SYSTEM

TECHNICAL FIELD

The present invention relates to a communication apparatus that uses a plurality of frequency channels to perform multi-carrier transmission, and, more particularly, to a communication apparatus that feeds back propagation path information of the frequency channels and a radio communication system including the communication apparatus.

BACKGROUND ART

Conventionally, in a closed-loop transmission diversity mode corresponding to OFDM (Orthogonal Frequency Division Multiplexing), when phase information or amplitude information is fed back for each subcarrier from a terminal to a base station, the following mapping is performed for each piece of information to reduce a necessary information amount.

A plurality of subcarriers is selected as reference subcarriers and remaining subcarriers are defined as adjacent subcarriers associated with the reference subcarriers. Phase estimate values and amplitude estimate values of the reference subcarriers are fed back based on normal mapping. Phase estimate values and amplitude estimate values of the adjacent subcarriers are fed back based on mapping with locations biased toward the vicinity of the phase estimate values and the amplitude estimate values of the associated reference subcarriers. On the other hand, in the base station, the phase estimate values and the amplitude estimate values fed back from the terminal are used to control a transmission antenna weight at the next transmission (see patent document 1).

On the condition that an information amount necessary for feedback is constant, performing such an operation may reduce the information amount in the closed-loop transmission diversity mode corresponding to OFDM by performing the above operations as compared to a mode of feeding back the phase information and amplitude information of all the subcarriers based on the normal mapping (the mapping applied to the reference subcarriers). As a result, the phases and amplitudes of the subcarriers may highly accurately be controlled and the performance of the transmission diversity may be improved without increasing the feedback information amount.

Patent Document 1: Japanese Patent Application Laid-Open No. 2003-87070, FIG. 4

DISCLOSURE OF INVENTION

Problem to be Solved by the Invention

However, since estimation errors of phase/amplitude estimate values of reference subcarriers affect mapping of phase/amplitude estimate values of associated adjacent subcarriers in a conventional closed-loop transmission diversity mode for OFDM, it is problematic that the transmission diversity performance is deteriorated not only in the reference subcarriers but also in the adjacent subcarriers when the quality (such as amplitude and signal-to-noise ratio) of the reference subcarriers are lowered due to selective fading, etc.

In view of the foregoing problems, an objects of the present invention is to provide a communication apparatus that can improve the accuracy of feedback propagation path information in a multi-carrier transmission system without increasing a feedback information amount between a transmitter and a receiver and without effects of quality deterioration in some frequency channels on other frequency channels in good quality.

Means for Solving Problem

To overcome the problems and achieve the object mentioned above, a communication apparatus, serving as a reception communication apparatus, according to an aspect of the present invention uses a plurality of frequency channels to perform multi-carrier transmission, and includes a grouping controlling unit that configures a plurality of layers including the plurality of frequency channels to perform control for hierarchically grouping the plurality of frequency channels such that the number of frequency channels included in a group of a layer becomes smaller than the number of frequency channels included in a group of a layer immediately above, a propagation path information estimating unit that estimates propagation path information of the plurality of frequency channels, an average value calculating unit that hierarchically groups the plurality of frequency channels under the control of the grouping controlling unit, the average value calculating unit calculating an average value of the propagation path information for each group in a highest layer with the use of the propagation path information estimate values, the average value calculating unit calculating the propagation path information estimate values used in each layer based on an average value of a layer immediately above to calculate an average value of the propagation path information for each group in other layers with the use of the propagation path information estimate values of the each layer, and a feedback unit that feeds back an average value acquired in each group as feedback information to a transmission communication apparatus.

Effect of the Invention

In a communication apparatus according to the present invention, an average value of propagation path information for each group in a layer is calculated from propagation path information estimate values of a layer immediately above and an average value of a layer immediately above. Therefore, as compared to the case that the propagation path information estimate values are directly quantized, equivalent or more accurate quantization can be realized with a smaller quantizing bit number and a feedback loop can be achieved at a higher speed due to the reduction of the information amount. Since a plurality of frequency channels is hierarchically grouped and an averaging process is executed for the propagation path information estimate value of each group, for example, if quality of a certain channel is poor and the estimate accuracy is deteriorated as a result, the effect thereof is distributed and feedback of highly accurate estimate values can be achieved.

EXPLANATIONS OF LETTERS OR NUMERALS

Figure 1:
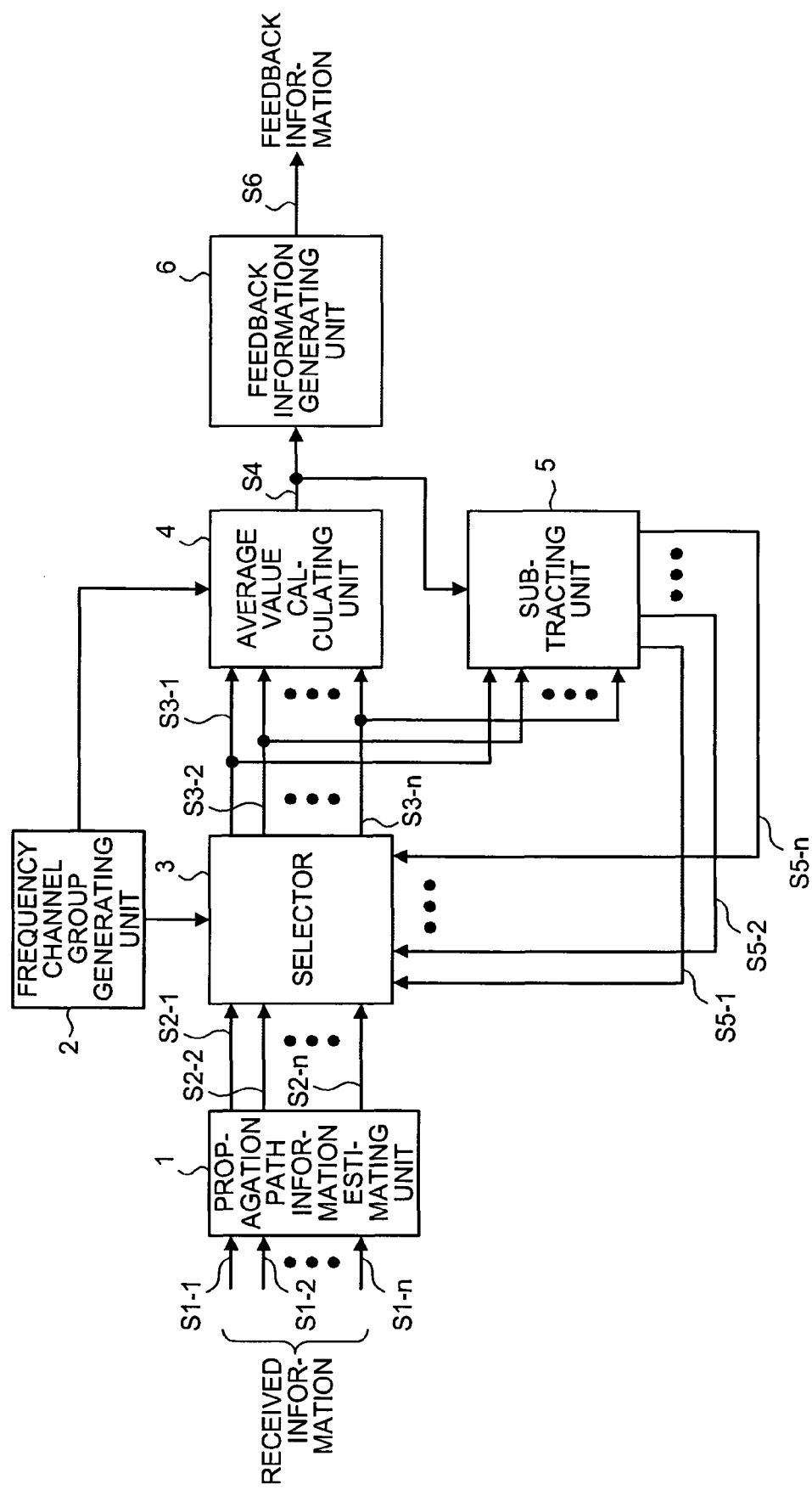
FIG. 1 is a view of a configuration example of a first embodiment of a communication apparatus according to the present invention.

1 Propagation path information estimating unit
2, 16 Frequency channel group generating unit
3 Selector
4 Average value calculating unit
5 Subtracting unit
6, 11, 17 Feedback information generating unit
12 Frequency channel group selecting/generating unit
13 Time direction averaging unit
14 Time direction difference calculating unit
15 Controlling unit
21 Controlling unit
22 Selector
23 Error-correction encoder
31 Modulating unit
32 Amplitude setting unit
33 Multiplying unit
34 Transmitting unit
41 Code multiplexing unit
61 Transmitting unit
62, 63 Transmission antenna
64, 65 Reception antenna
66 Receiver
71, 72, 73, 74 Propagation path
81 Modulating unit
82 Transmission weight controlling unit
83-1 to 83-m Transmission antenna
91-1 to 91-n Reception antenna
92 Reception weight controlling unit
93 Demodulating unit
94 Propagation path information estimating unit
95 SVD
101 MIMO propagation path

BEST MODE(S) FOR CARRYING OUT THE INVENTION

Embodiments of a communication apparatus according to the present invention will hereinafter be described in detail with reference to the drawings. The present invention is not limited to the embodiments.

First Embodiment

FIG. 1 is a view of a configuration example of a communication apparatus according to the present invention. This communication apparatus performs multi-carrier transmission (e.g., the OFDM system) and includes, for example, a propagation path information estimating unit 1 that estimates propagation path information based on reception signals S1-1, S1-2, . . . , and S1-n; a frequency channel group generating unit 2 that gives instructions for hierarchically grouping subcarriers; a selector 3 that outputs propagation path information estimate values S2-1, S2-2, . . . , and S2-n or subtracting unit outputs S5-1, S5-2, . . . , and S5-3; an average value calculating unit 4 that averages selector outputs S3-1, S3-2, . . . , and S3-n; a subtracting unit 5 that subtracts an average value S4 from the selector outputs S3-1, S3-2, . . . , and S3-n; and a feedback information generating unit 6 that generates feedback information S6 using the average value S4. The above character n indicates a number for identifying the subcarriers in the multi-carrier communication.

The operation of the communication apparatus configured as above will then briefly be described. The propagation path information estimating unit 1 uses the reception signals S1-1 to S1-n deconstructed on a subcarrier basis to estimate the propagation path information and outputs the propagation path information estimate values S2-1 to S2-n for each subcarrier. The estimated propagation path information estimate values S2-1 to S2-n are input to the selector 3, and the subtracting unit outputs S5-1 to S5-n from the subtracting unit 5 are also input to the selector 3. The selector 3 selects and outputs either the propagation path information estimate values S2-1 to S2-n or the subtracting unit outputs S5-1 to S5-n as the selector outputs S3-1 to S3-n based on the instructions from the frequency channel group generating unit 2. The selector outputs S3-1 to S3-n are input to the average value calculating unit 4, which hierarchically groups the selector outputs S3-1 to S3-n to calculate the average value S4 of each group based on the instructions from the frequency channel group generating unit 2. When receiving the average value S4, the subtracting unit 5 subtracts the average value S4 corresponding to the branch numbers 1 to n of the subcarriers from the selector outputs S3-1 to S3-n and outputs the result as the subtracting unit outputs S5-1 to S5-n. The feedback information generating unit 6 generates and outputs the feedback information S6 using the average value S4.

The frequency channel group generating unit 2 gives instructions for hierarchically grouping subcarriers. For example, the highest layer is configured by a single group including all the subcarriers, and in the next layer, the number of subcarriers included in each group present in that layer is set smaller than the number of subcarriers included in each group present in the higher layer. That is, in accordance with the instructions from the frequency channel group generating unit 2, the subcarriers are hierarchically divided and grouped until the number of subcarriers included in each group becomes equal to or less than a predetermined value.

The selector 3 first outputs the propagation path information estimate values S2-1 to S2-n and then outputs the subtracting unit outputs S5-1 to S5-n in accordance with the instructions from the frequency channel group generating unit 2. The average value calculating unit 4 sequentially calculates the average values of the subcarrier groups from the highest layer to the lowest layer in accordance with the instructions from the frequency channel group generating unit 2. These operations are performed every time the propagation path information estimate values S2-1 to S2-n are updated.

Figure 2:
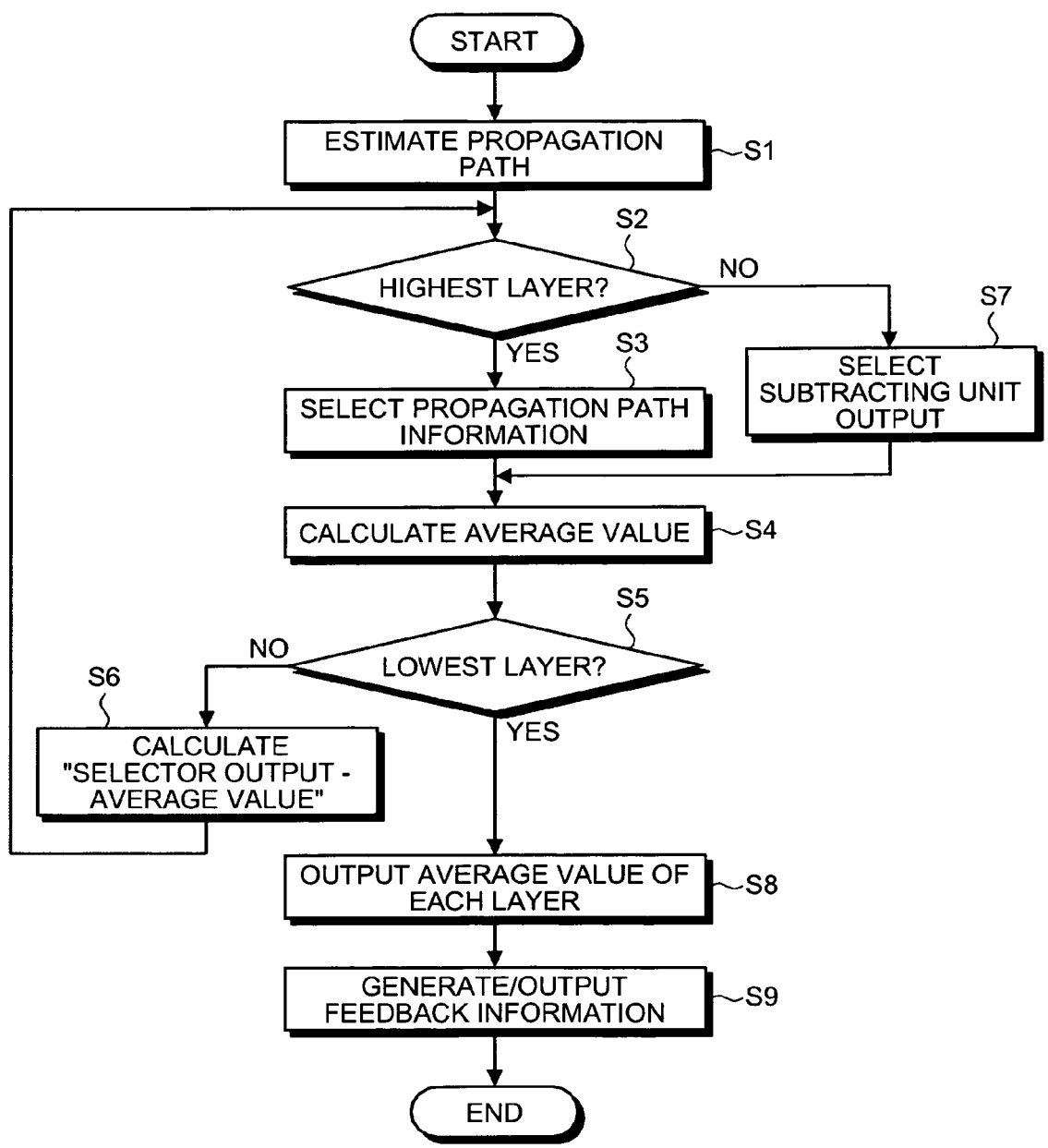
FIG. 2 is a flowchart of a process flow of the first embodiment.

The process in the communication apparatus configured as above will be described from the reception of the reception signals S1-1 to S1-n to the output of the feedback information S6 with reference to the drawings. FIG. 2 is a flowchart of a process flow, and coordinated operations are achieved by the propagation path information estimating unit 1, the frequency channel group generating, unit 2, the selector 3, the average value calculating unit 4, and the subtracting unit 5 to sequentially perform the following processes from the highest layer.

First, the propagation path information estimating unit 1 uses the reception signals S1-1 to S1-n to estimate the propagation path information for each subcarrier and outputs the propagation path information estimate values S2-1 to S2-n of the subcarriers (step S1). For example, when executing a process for the highest layer (Yes at step S2), the selector 3 selects the propagation path information estimate values S2-1 to S2-n and outputs the selection result, i.e., the selector outputs S3-1 to S3-n to the average value calculating unit 4 (step S3). In the group of the highest layer, the average value calculating unit 4 calculates an average value of the selector outputs S3-1 to S3-n of the subcarriers in the group (step S4). The subtracting unit 5 subtracts the average value S4 from the selector outputs S3-1 to S3-n and outputs the result thereof, i.e., the subtracting unit outputs S5-1 to S5-n to the selector 3 (No at step S5, step S6).

In the next layer (No at step S2), the selector 3 selects the subtracting unit outputs S5-1 to S5-n and outputs the selection result, i.e., the selector outputs S3-1 to S3-n to the average value calculating unit 4 (step S7). The average value calculating unit 4 then calculates an average value of the selector outputs S3-1 to S3-n of the subcarriers in each group of this layer (step S4). Above steps S6, S7, and S4 are then repeatedly executed until the lowest layer (Yes at step S5).

When the calculation of the average value is completed in the lowest layer (Yes at step S5), the average value calculating unit 4 outputs the average value S4 of the groups of the layers to the feedback information generating unit 6 (step S8). Lastly, the feedback information generating unit 6 generates and outputs the feedback information S6 from the received average value S4 (step S9).

The reception communication apparatus executes the above process (steps S2 to S9) every time the propagation path information estimate values S2-1 to S2-n are updated and feeds back the feedback information S6 acquired from the above process to the transmission communication apparatus. When the transmission communication apparatus receives the feedback information S6, a procedure opposite to the above procedure for calculating the average value is used to acquire the propagation path information estimate values S2-1 to S2-n of the subcarriers of the reception communication apparatus. The transmission diversity and the Eigenbeam MIMO (Multi-Input Multi-Output) transmission can be realized by using these propagation path information estimate values.

The detailed operation of the communication apparatus of the embodiment will then be described. For the sake of clarity of the description, the number of subcarriers n is assumed to be the power of two in the following example. The present invention does not limit the number of subcarriers n to the power of two.

The propagation path information estimating unit 1 estimates propagation channel responses, for example. The propagation path information estimate values S271 to S2-n at time k is expressed as a vector h(k) by the following equation (1)

$$h(k)=[h_1(k),h_2(k),\ldots,h_n(k),] \quad (1)$$

where $h_1(k)$ corresponds to the propagation path information estimate value S2-1 of a first subcarrier, $h_2(k)$ corresponds to the propagation path information estimate value S2-2 of a second subcarrier, ..., and $h_n(k)$ corresponds to the propagation path information estimate value S2-n of a nth subcarrier.

If subcarriers #1 to #n are hierarchically grouped, a propagation path information estimate value S2-I of an ith ($1 \leq i \leq n$) subcarrier is expressed by SC(i). A subcarrier group of a first layer is expressed by SCG(l,m).

In this expression, l indicates a layer number, which is increased by 1 toward a lower layer from the highest layer defined as 1, and m indicates a number assigned to a subcarrier group configured in the layer l.

For example, in the first layer (the highest), all the subcarriers are handled as one subcarrier group as shown in the following equation (2).

$$SCG(1,1)=[SC(1),SC(2),\ldots,SC(n)] \quad (2)$$

In the second layer, all the subcarriers are divided into two groups as shown in the following equation (3).

$$SCG(2,1)=\lfloor SC(1), SC(2),\ldots,SC(n/2)\rfloor$$

$$SCG(2,2)=[SC(n/2+1), SC(n/2+2),\ldots,SC(n)] \quad (3)$$

In the 1th layer, all the subcarriers are divided into $2^{l-1}$ groups as shown in the following equation (4) and finally, in the lowest layer, the subcarriers are divided such that one subcarrier forms one group.

$$SCG(l, 1) = \left[SC(1), SC(2), \ldots, SC\left(\frac{n}{2^{l-1}}\right)\right] \quad (4)$$

$$SCG(l, 2) = \left[SC\left(\frac{n}{2^{l-1}} + 1\right), SC\left(\frac{n}{2^{l-1}} + 2\right), \ldots, SC\left(\frac{2n}{2^{l-1}}\right)\right]$$

$$\ldots$$

$$SCG(l, 2^{l-1}) = \left[SC\left(\frac{(2^{l-1} - 1)n}{2^{l-1} + 1}\right), SC\left(\frac{(2^{l-1} - 1)n}{2^{l-1} + 2}\right), \ldots, SC(n)\right]$$

For the subcarrier groups divided as above, the following process is sequentially performed from the highest layer.

The average value calculating unit 4 calculates an average value of channel coefficients in the subcarrier group SCG(l, m); the subtracting unit 5 subtracts an average value of subcarrier groups in a layer immediately above; and the subtraction result is defined as a channel coefficient average value <h(l,m)>(k). The channel coefficient average value of the SCG(l,m) is expressed as the following equation (5).

[Equation 1]

$$\langle h(l, m)\rangle(k) = \frac{l}{\frac{n}{2^{l-1}}} \sum_{i=\frac{(m-1)n}{2^{l-1}}}^{\frac{mn}{2^{l-1}}-1} h_i(k) - \left(h\left(l-1, \left[\frac{m}{2}\right]\right)\right)(k) \quad (5)$$

The following equation (6) represents a smallest integer satisfying a≧b. It is assumed that <h(0,m)>(k)=0.

[Equation 2]

$$a=[b] \quad (6)$$

The reception communication apparatus feeds back <h(l,m)>(k) obtained as above as a propagation path estimate value at time k to the transmission communication apparatus. The transmission communication apparatus executes calculations for the fed-back <h(l,m)>(k) in accordance with a procedure opposite to the above description to reconstruct the propagation path information estimate value, which is used to perform the transmission diversity, the Eigen-beam MIMO transmission, etc.

Figure 3:
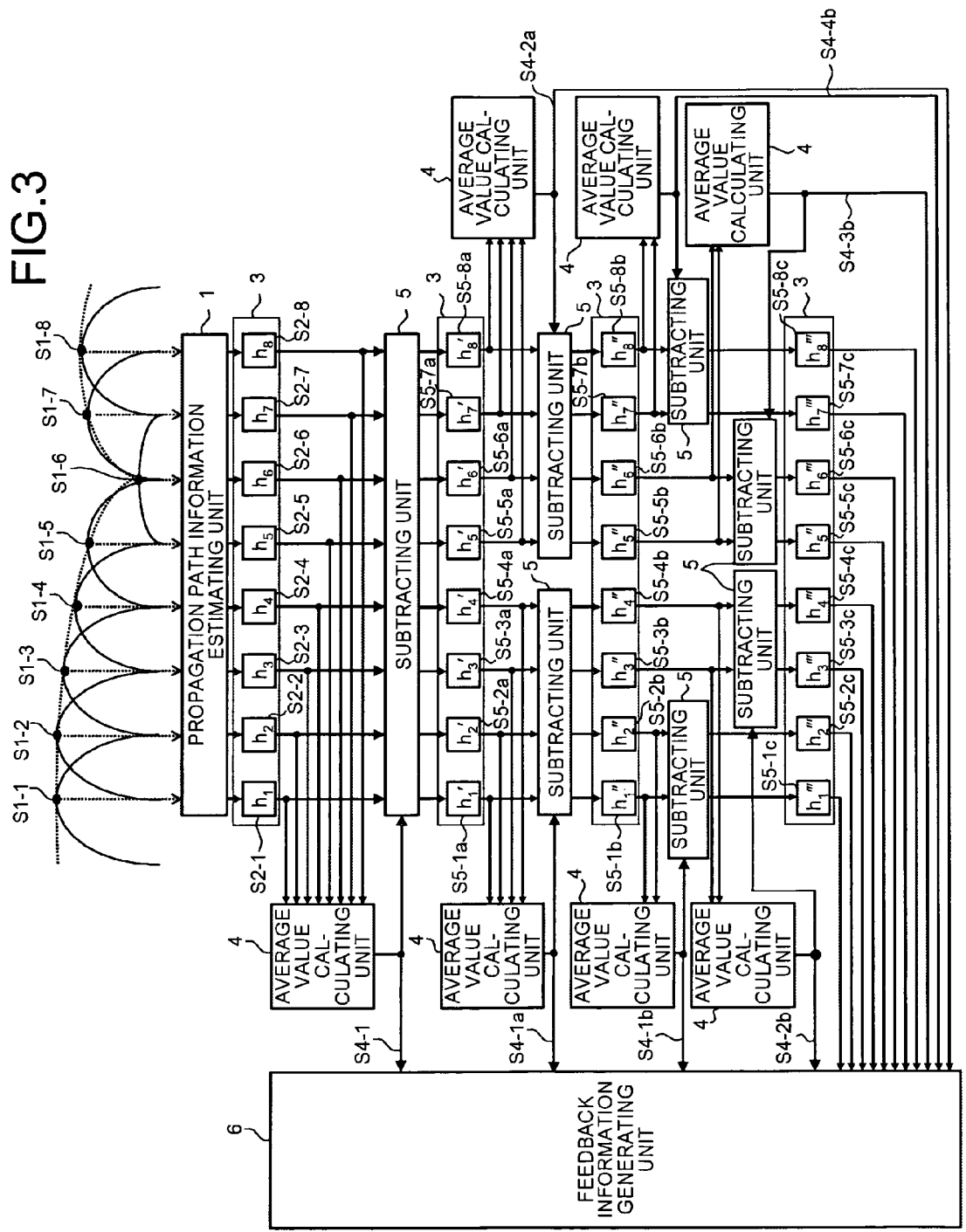
FIG. 3 is a view of a calculation procedure of the communication apparatus in the case of the number of subcarriers n=8.

A calculation procedure in the case of the number of subcarriers n=8 will specifically be described with reference to the drawings. FIG. 3 is a view of a calculation procedure of the communication apparatus of the embodiment in the case of the number of subcarriers n=8. S1-1 to S1-8 shown in FIG. 3 are reception signals; S2-1 to S2-8 are propagation path information estimate values of the highest layer; S5-1a to S5-8a are propagation path information estimate values of a second layer (corresponding to the subtracting unit outputs S5-1 to S5-8); S5-1b to S5-8b are propagation path information estimate values of a third layer (corresponding to the subtracting unit outputs S5-1 to S5-8); S5-1c to S5-8c are propagation path information estimate values of a fourth layer (corresponding to the subtracting unit outputs S5-1 to S5-8); S4-1 is an average value of the first group of the highest layer (corresponding to the average value S4); S4-1a is an average value of the first group of the second layer (corresponding to the average value S4); S4-2a is an average value of the second group of the second layer (corresponding to the average value S4); S4-1b is an average value of the first group of the third layer (corresponding to the average value S4); S4-2b is an average value of the second group of the third layer (corresponding to the average value S4); S4-3b is an average value of the third group of the third layer (corresponding to the average value S4); and S4-4b is an average value of the fourth group of the third layer (corresponding to the average value S4).

In the highest layer (hereinafter, the first layer), the propagation path information estimating unit 1 estimates the propagation path information from the reception signals S1-1 to S1-8 and outputs the propagation path information estimate values S2-1 to S2-8 of the first layer. In the first layer, one group (the first group of the first layer) including all of eight subcarriers is generated, and the average value calculating unit 4 calculates and outputs the average value S4-1 of the propagation path information estimate values of this group. The average value S4-1 of the first group of the first layer is input to the feedback information generating unit 6 and the subtracting unit 5.

In the second layer (hereinafter, the second layer), the subtracting unit 5 subtracts the average value S4-1 of the first group of the first layer from the propagation path information estimate values S2-1 to S2-8 of the first layer and outputs the result as the propagation path information estimate values S5-1a to S5-8a of the second layer. In the second layer, two groups are generated, each of which includes four subcarriers; the first group of the second layer includes the propagation path information estimate values S5-1a to S5-4a of the second layer; and the second group of the second layer includes the propagation path information estimate values S5-5a to S5-8a of the second layer. The average value calculating unit 4 calculates an average value of each group (the average value S4-1a of the first group of the second layer and the average value S4-2a of the second group of the second layer) and outputs the result to the feedback information generating unit 6 and the subtracting unit 5.

In the third layer (hereinafter, the third layer), the subtracting unit 5 subtracts the average value S4-1a of the first group of the second layer from the propagation path information estimate values S5-1a to S5-4a of the second layer and outputs the result as the propagation path information estimate values S5-1b to S5-4b of the third layer. Similarly, the subtracting unit 5 subtracts the average value S4-2a of the second group of the second layer from the propagation path information estimate values S5-5a to S5-8a of the second layer and outputs the result as the propagation path information estimate values S5-5b to S5-8b of the third layer. In the third layer, four groups are generated, each of which includes two subcarriers; the first group of the third layer includes the propagation path information estimate values S5-1b and S5-2b of the third layer; the second group of the third layer includes the propagation path information estimate values S5-3b and S5-4b of the third layer; the third group of the third layer includes the propagation path information estimate values S5-5b and S5-6b of the third layer; and the fourth group of the third layer includes the propagation path information estimate values S5-7b and S5-8b of the third layer. The average value calculating unit 4 calculates an average value of each group (the average value S4-1b of the first group of the third layer, the average value S4-2b of the second group of the third layer, the average value S4-3b of the third group of the third layer, and the average value S4-4b of the fourth group of the third layer) and outputs the result to the feedback information generating unit 6 and the subtracting unit 5.

In the fourth layer (hereinafter, the fourth layer), the subtracting unit 5 subtracts the average value S4-1b of the first group of the third layer from the propagation path information estimate values S5-1b and S5-2b of the third layer and outputs the result as the propagation path information estimate values S5-1c and S5-2c of the fourth layer. Similarly, the subtracting unit 5 subtracts the average value S4-2b of the second group of the third layer from the propagation path information estimate values S5-3b and S5-4b of the third layer and outputs the result as the propagation path information estimate values S5-3c and S5-4c of the fourth layer. Similarly, the subtracting unit 5 subtracts the average value S4-3b of the third group of the third layer from the propagation path information estimate values S5-5b and S5-6b of the third layer and outputs the result as the propagation path information estimate values S5-5c and S5-6c of the fourth layer. Similarly, the subtracting unit 5 subtracts the average value S4-4b of the fourth group of the third layer from the propagation path information estimate values S5-7b and S5-8b of the third layer and outputs the result as the propagation path information estimate values S5-7c and S5-8c of the fourth layer. Since further grouping cannot be performed for the subcarriers in the fourth layer, the propagation path information estimate values S5-1c to S5-8c of the fourth layer are output as the average values (corresponding to S4 output by the subtracting unit 5 shown in FIG. 1) to the feedback information generating unit 6.

Although FIG. 3 expansively depicts a series of loop processes in accordance with the coordinated operations of the selector 3, the average value calculating unit 4, and the subtracting unit 5 to facilitate the description of the calculation procedure, the processes may actually be configured by expanded circuits. Although not shown, the selector 3 and the average value calculating unit 4 execute processes based on instructions from the frequency channel group generating unit 2.

Figure 4:
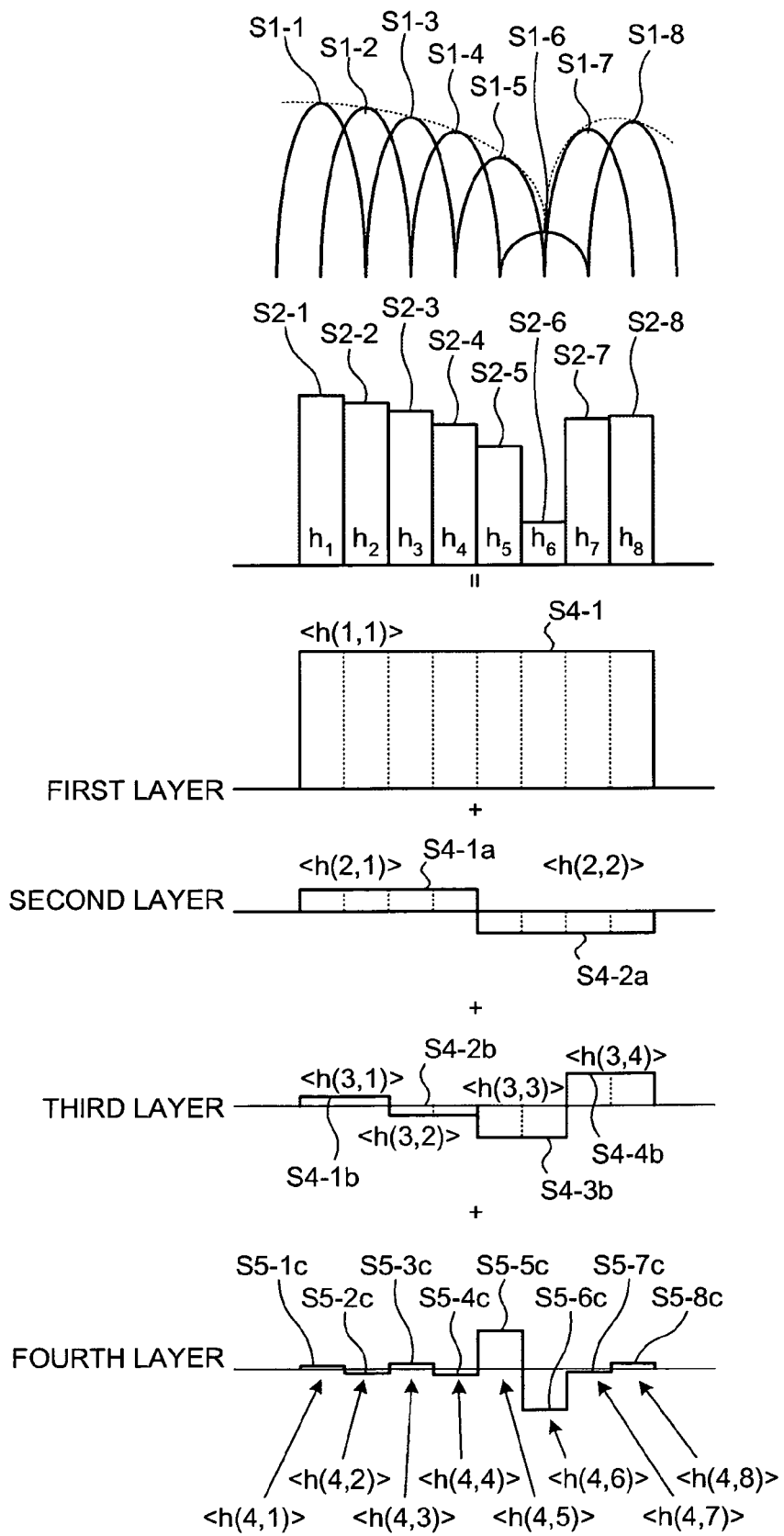
FIG. 4 is a diagrammatic view of average values calculated by the process of FIG. 3.

FIG. 4 is a diagrammatic view of the average values calculated by the process of FIG. 3. This diagrammatic view depicts how the propagation path information estimate values S2-1 to S2-8 are deconstructed in each layer in accordance with the calculation procedure shown in FIG. 3 into the average values S4-1 (corresponding to <h(1,1)> of FIG. 4), S4-1a and S4-2a (corresponding to <h(2,1)> and <h(2,2)> of FIG. 4), S4-1b to S4-4b (corresponding to <h(3,1)>, <h(3,2)>, <h(3,3)>, and <h(3,4)> of FIG. 4), and S5-1c to S5-8c (corresponding to <h(4,1)>, <h(4,2)>, <h(4,3)>, <h(4,4)>, <h(4,5)>, <h(4,6)>, <h(4,7)>, and <h(4,8)> of FIG. 4). The reception communication apparatus feeds back these average values to the transmission communication apparatus. The transmission communication apparatus adds up the average values to restore the propagation path information estimate values of the reception side.

If the channel responses of the propagation paths are used as the propagation path information estimate values, the present invention can be applied regardless of how to determine coordinates, such as complex number representation and polar coordinate representation. For example, when calculating in accordance with the complex number display, the above calculation procedure for the average values may independently be applied to the in-phase component (I-ch) and the quadrature component (Q-ch) or may only be applied to one component to directly feed back the estimate values for the other component. Similarly, when using the polar coordinate representaion, the above calculation procedure for the average values may independently be applied to the absolute value component and the angular component of amplitude or may only be applied to one component to directly feed back the estimate values for the other component.

Although the propagation path information estimate values of all the subcarriers are used in the case described above, this is not a limitation, and some representative subcarriers may be selected to acquire a propagation path information estimate value for each selected subcarrier and to execute the above averaging process for the acquired propagation path information estimate values. Such a case is assumed when each subcarrier has a narrow frequency band and a strong correlation with neighboring subcarriers, and is particularly useful for a method of reducing a feedback information amount in this situation.

Although the group of the highest layer (the first layer) includes all the subcarriers in the description of FIGS. 3 and 4, this is not necessarily a limitation, and the highest layer may be divided into a plurality of groups. A method of grouping is appropriately selected depending on situations of the propagation paths, an allowable feedback information amount, etc.

In this embodiment, the average value of each layer is calculated from differences between propagation path information estimate values of a layer immediately above and an average value of a layer immediately above. Therefore, as compared to the case that the propagation path information estimate values are directly quantized, equivalent or more accurate quantization can be realized with a smaller quantizing bit number and a feedback loop can be achieved at a higher speed due to the reduction of the information amount.

Since an averaging process is executed from the propagation path information estimate values of all the subcarriers, for example, even when a certain subcarrier has a poor quality resulting in deterioration of the estimation accuracy, the effect thereof is distributed so as not to cause deterioration of the estimation accuracy of all the subcarriers, which occurs in the conventional case, and therefore, feedback of highly accurate estimate values can be realized.

Second Embodiment

Figure 5:
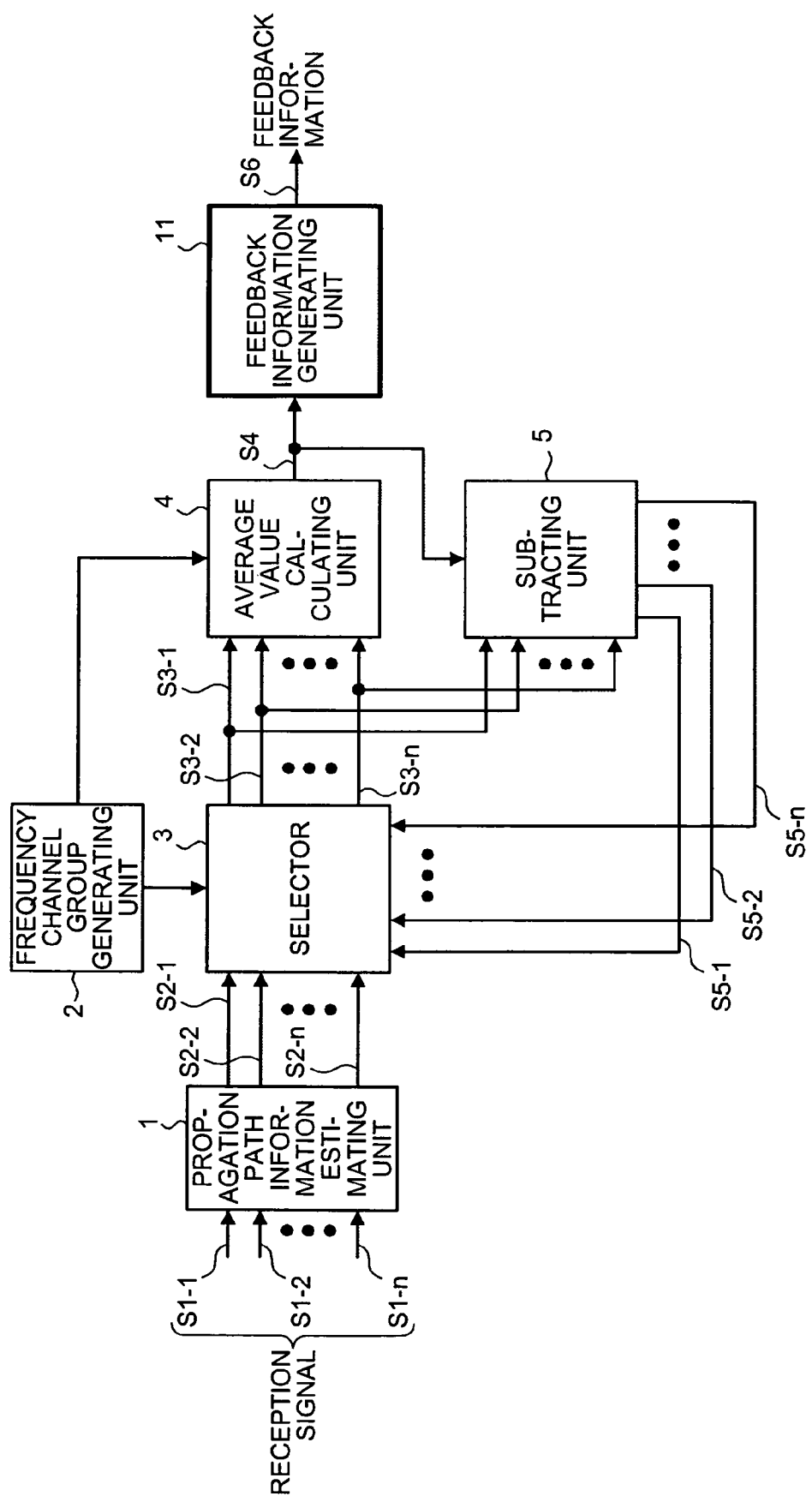
FIG. 5 is a view of a configuration example of a second embodiment of the communication apparatus according to the present invention.

FIG. 5 is a view of a configuration example of a second embodiment of the communication apparatus according to the present invention and a feedback information generating unit 11 is included instead of the feedback information generating unit 6 of the first embodiment. The same reference numerals are added to the same constituent elements as FIG. 1 of the first embodiment and the description thereof will be omitted. The operation of the feedback information generating unit 11 different from the first embodiment will be described.

Temporal fluctuations of the average value calculated in the first embodiment become more moderate when the number of subcarriers becomes greater, i.e., in the average value of the higher layer. Therefore, in this embodiment, the feedback information generating unit 11 changes the cycle of feeding back the average values depending on which layer the average value is calculated for, and a longer cycle is used for the average value of a higher layer. Therefore, an information amount necessary for feedback can further be reduced without reducing the accuracy of the fed-back propagation path information estimate values.

Figure 6:
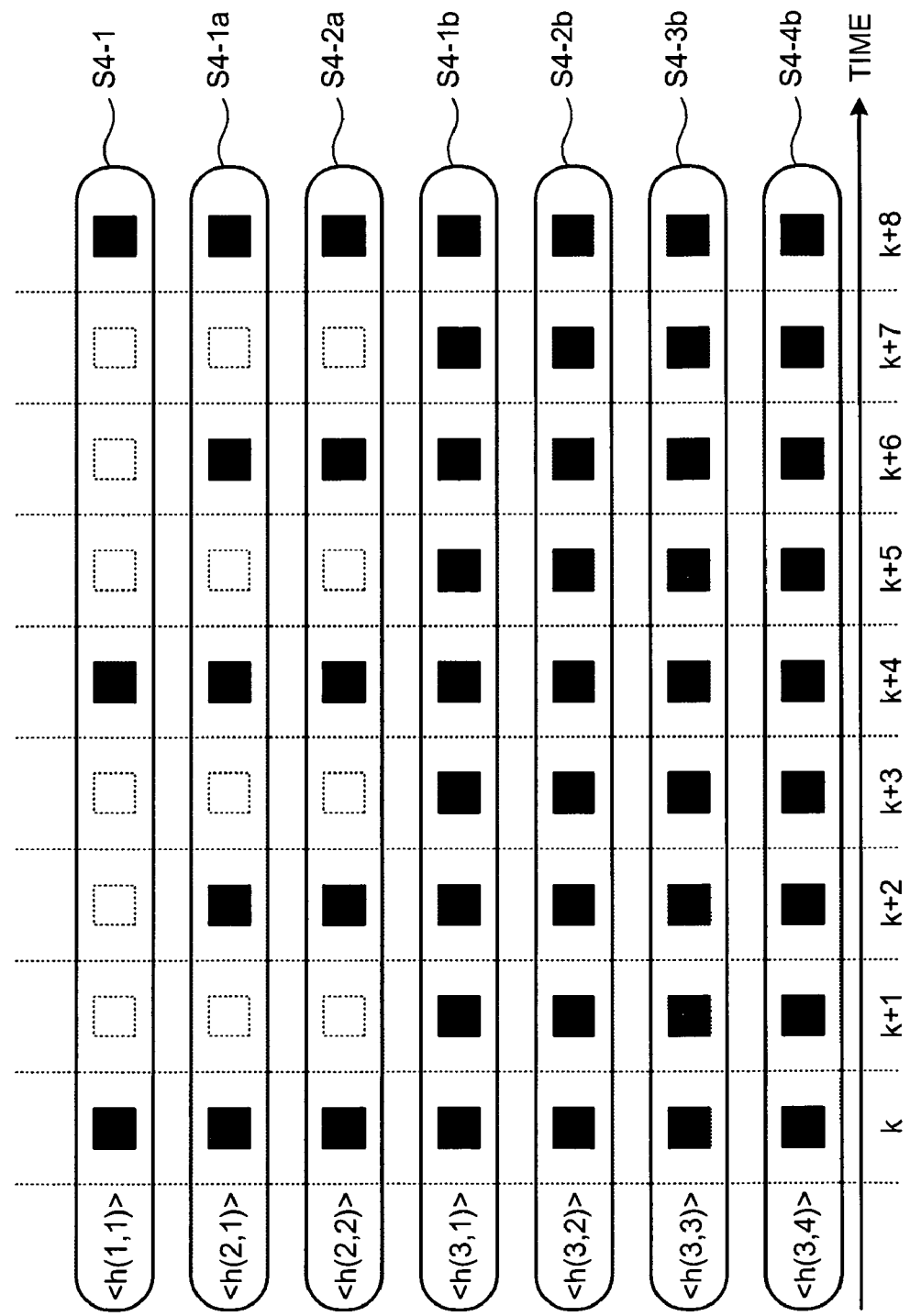
FIG. 6 is a view of an example of a specific process of a feedback information generating unit in the communication apparatus of the second embodiment.

The characteristic operations of this embodiment will specifically be described with reference to the drawings. FIG. 6 is a view of an example of a specific process of the feedback information generating unit 11 in the communication apparatus of the second embodiment. For simplicity of description, the number n of subcarriers is 4 in this case.

In FIG. 6, the horizontal axis represents time points, and at each time point, the average values of groups shown by black squares are fed back and the average values of groups shown by white squares are not fed back. That is, in this embodiment, the feedback information generating unit 11 feeds back the average value S4-1 of the first group of the first layer at the time points k, k+4, and k+8. The average values S4-1a and S4-2a of the second layer are fed back at the time points k, k+2, k+4, k+6, and k+8. The average values S4-1b, S4-2b, S4-3b, and S4-4b of the third layer are fed back at all the time points (k, k+1, . . . , k+7, and k+8). Although a range of the time points from k to k+8 is shown in FIG. 6 for convenience of description, the feedback is also performed in the same cycle at time points before and after the range.

Although an average value of a higher layer is needed to calculate an average value of a certain layer as shown in the first embodiment, the latest average value lastly fed back is used in this embodiment. For example, in FIG. 6, a value of the average value S4-1b of the first group of the third layer at the time point k+1 is calculated with the use of the average value S4-1 of the first group of the first layer and the average values S4-1a and S4-2a of the second layer at the time point k.

In this way, a longer feedback cycle is used for the average value of a higher layer in this embodiment. Therefore, the same effect as the first embodiment can be acquired and, since the feedback information amount is further reduced, a higher-speed feedback loop can further be achieved.

Third Embodiment

Figure 7:
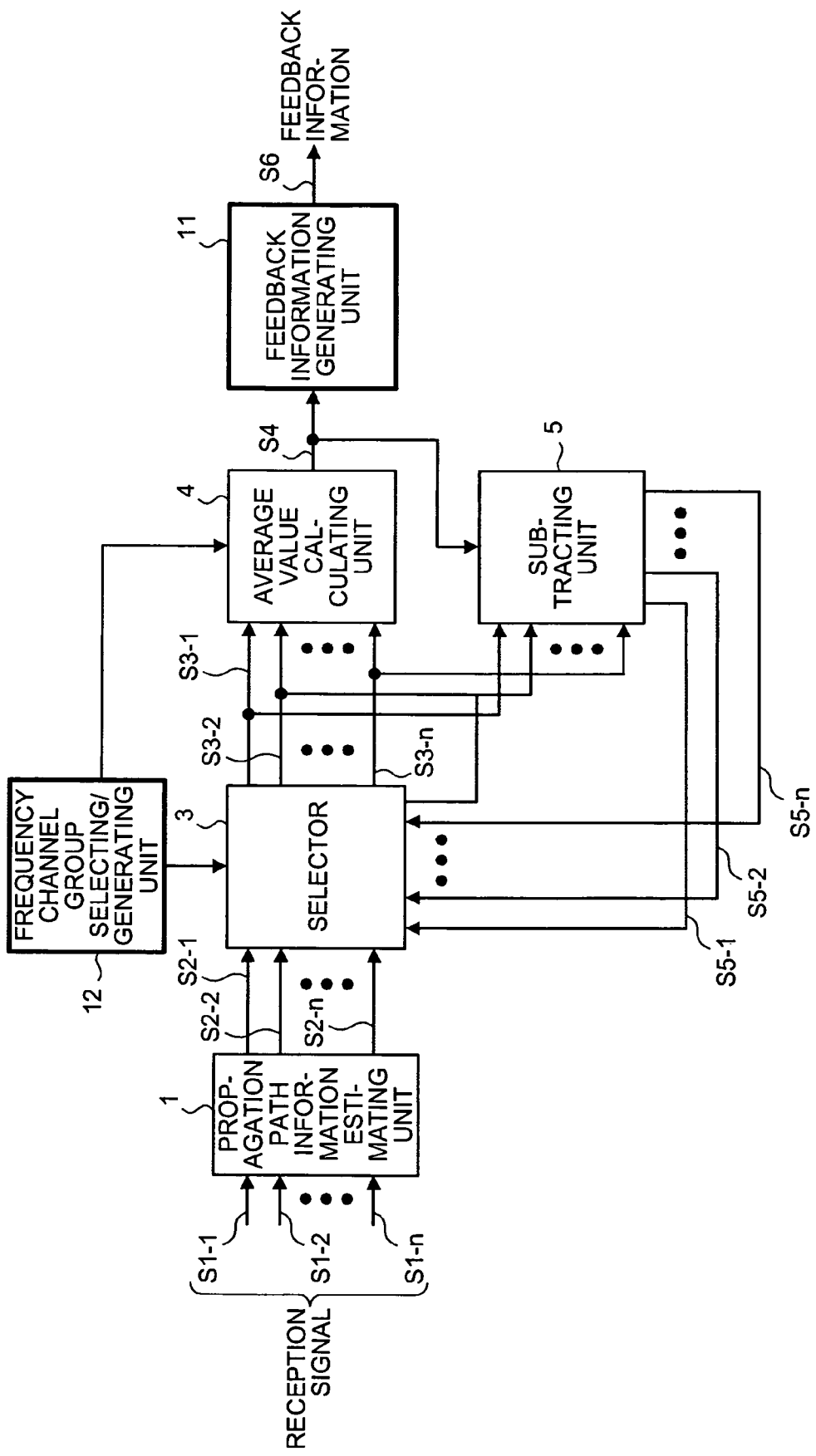
FIG. 7 is a view of a configuration example of a third embodiment of the communication apparatus according to the present invention.

FIG. 7 is a view of a configuration example of a third embodiment of the communication apparatus according to the present invention and a frequency channel group selecting/generating unit 12 is included instead of the above frequency channel group generating unit 2 of the second embodiment. The same reference numerals are added to the same constituent elements as FIG. 5 of the second embodiment and the description thereof will be omitted. The operation of the frequency channel group selecting/generating unit 12 different from the second embodiment will be described.

In this embodiment, as is the case with the second embodiment, the cycle of feeding back the average values is changed depending on which layer the average value is calculated for, and a longer feedback cycle is used for a higher layer. In this embodiment, if a plurality of groups exists in a certain layer, processes are executed to send the average values at different time points among the groups and to thin out and send the average values under the control of the frequency channel group selecting/generating unit 12 and the feedback information generating unit 11, instead of feeding back the average values of all the groups in the layer at the same time. As a result, further reduction of the feedback information amount can be achieved.

Figure 8:
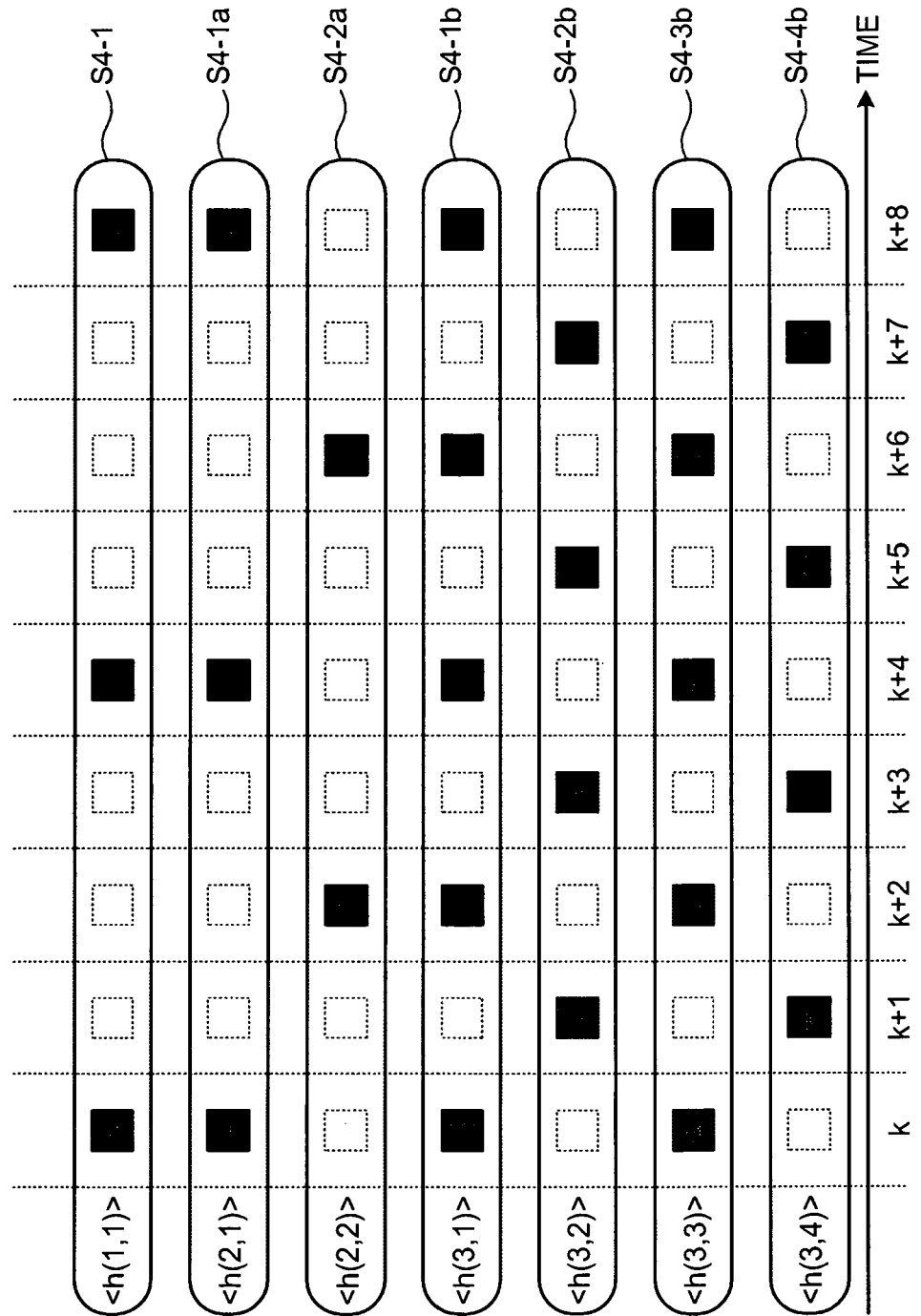
FIG. 8 is a view of an example of a specific process of the communication apparatus of the third embodiment.

The characteristic operations of this embodiment will specifically be described with reference to the drawings. FIG. 8 is a view of an example of a specific process of the communication apparatus of the third embodiment. For simplicity of description, the number n of subcarriers is 4 in this case.

In FIG. 8, the horizontal axis represents time points, and at each time point, the average values of groups shown by black squares are fed back and the average values of groups shown by white squares are not fed back. That is, in this embodiment, the average value S4-1 of the first group of the first layer is fed back at the time points k, k+4, and k+8 as above. On the other hand, the average values S4-1a and S4-2a of the second layer are alternately fed back under the control of the frequency channel group selecting/generating unit 12 and the feedback information generating unit 11 such that the feedback time points does not overlap; for example, the average value S4-1a is fed back at the time points k, k+4, and k+8; and the average value S4-2a is fed back at the time points k+2 and k+6. The average values S4-1b, S4-2b, S4-3b, and S4-4b of the third layer are also appropriately thinned out and fed back under the control of the frequency channel group selecting/generating unit 12 and the feedback information generating unit 11; for example, the average values S4-1b and S4-3b are fed back at the time points k, k+2, k+4, k+6, and k+8; and the average values S4-2b and S4-4b are fed back at the time points k+1, k+3, k+5, and k+7. Although a range of the time points from k to k+8 is shown in FIG. 8 for convenience of description, the feedback is also performed in the same cycle at time points before and after the range.

Although an average value of a higher layer is needed to calculate an average value of a certain layer as shown in the first embodiment, the latest average value lastly fed back is used in this embodiment as is the case with the second embodiment. For example, in FIG. 8, a value of the average value S4-1b of the first group of the third layer at the time point k+3 is calculated with the use of the average value S4-1 of the first group of the first layer at the time point k, the average values S4-1a of the first group of the second layer, and the average values S4-2a of the second group of the second layer at the time point k+2.

When reconstructing the propagation path information of the subcarriers, the transmission communication apparatus receiving the feedback cannot directly reconstruct the propagation path information of a subcarrier if the average value of the lowest layer thereof is not sent. For example, at the time point k+2 in FIG. 8, the propagation path information of the first and third subcarriers can be reconstructed since the average values S4-1b and S4-3b are fed back, while the propagation path information of the second and fourth subcarriers cannot be reconstructed since the average values S4-2b and S4-4b are not fed back. Therefore, in this embodiment, the reconstruction is enabled by executing an interpolation process. For example, the average value S4-2b may be obtained through interpolation from the average values S4-1b and S4-3b, and the average value S4-2b may be obtained by executing extrapolation. Such an interpolation process can be applied not only to the lowest layer but also to the intermediate layers. The transmission path information can be reconstructed on the transmission side by executing the above interpolation process even when the reception communication apparatus thins out the average values to be fed back.

If the feedback time points of the average values of each group are shifted such that the overall feedback information amount becomes a certain value or falls within a certain range, the feedback transmission may efficiently be performed.

In this way, instead of acquiring and feeding back the average values of all the groups at the same time points, the average values are fed back at the shifted time points in the layers having a plurality of groups in this embodiment. Therefore, the same effect as the first embodiment may be acquired and the feedback information amount may further be reduced as compared to the second embodiment.

Fourth Embodiment

Figure 9:
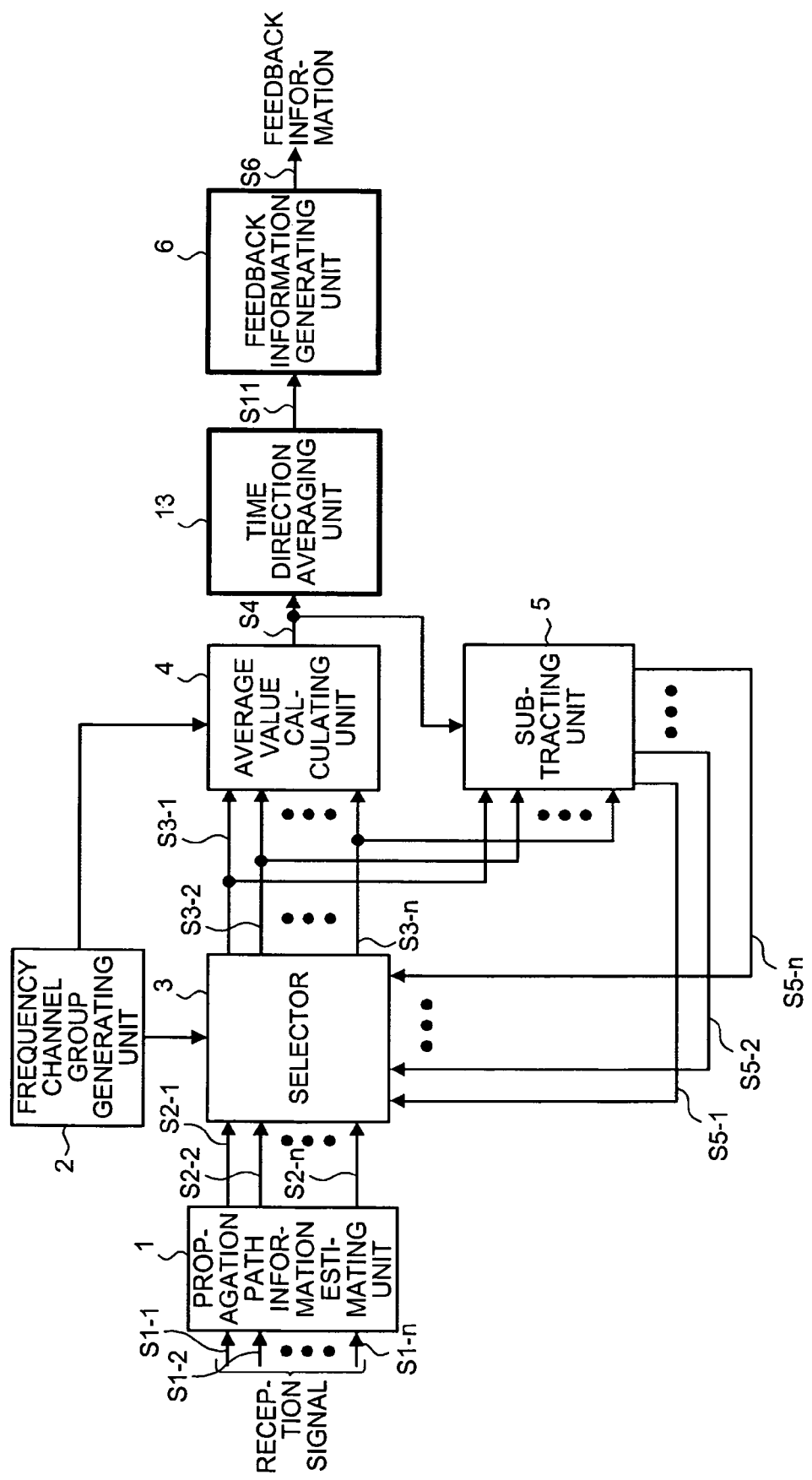
FIG. 9 is a view of a configuration example of a fourth embodiment of the communication apparatus according to the present invention.

FIG. 9 is a view of a configuration example of a fourth embodiment of the communication apparatus according to the present invention and a time direction averaging unit 13 is included that calculates an average value S11 in the time direction in addition to the configuration of the first embodiment. The same reference numerals are added to the same constituent elements as FIG. 1 of the first embodiment and the description thereof will be omitted. The operation of the time direction averaging unit 13 different from the first embodiment will be described.

The characteristic operations of this embodiment will specifically be described with reference to the drawings. The time direction averaging unit 13 averages the received average values in the time direction for each group and outputs the result, i.e., the average value S11 to the feedback information generating unit 6. The technique of the time direction averaging includes a method of performing cyclic addition, a method of using a moving average, an FIR filter, and an IIR filter, and a combination thereof. An oblivion factor of the cyclic addition, a moving average length, a tap length and a tap coefficient of the FIR/IIR filter may adaptively be changed in accordance with environmental fluctuations such as a fluctuation velocity of a propagation path or may not be changed if not needed. Since the averaging in the time direction improves a signal-to-noise ratio of the propagation path information estimate values and the time fluctuations are moderated by the effect of the averaging, a longer cycle may be used for transmitting the feedback information and, as a result, the feedback control may be performed with a smaller information amount.

In this way, the received average values are further averaged in the time direction for each group in this embodiment of the present invention. Therefore, the estimation accuracy of the propagation path information estimate values can further be improved and more accurate feedback control can be performed.

In this embodiment of the present invention, since the time fluctuations are moderated by averaging the average values in the time direction for each group, a longer cycle may be used for transmitting the feedback information and the feedback control can be performed with a smaller information amount.

Although the averaging process in the time direction is applied to the configuration of the first embodiment in this embodiment for convenience of description, this is not a limitation and the process can be applied to the configuration of the second or third embodiment.

Fifth Embodiment

Figure 10:
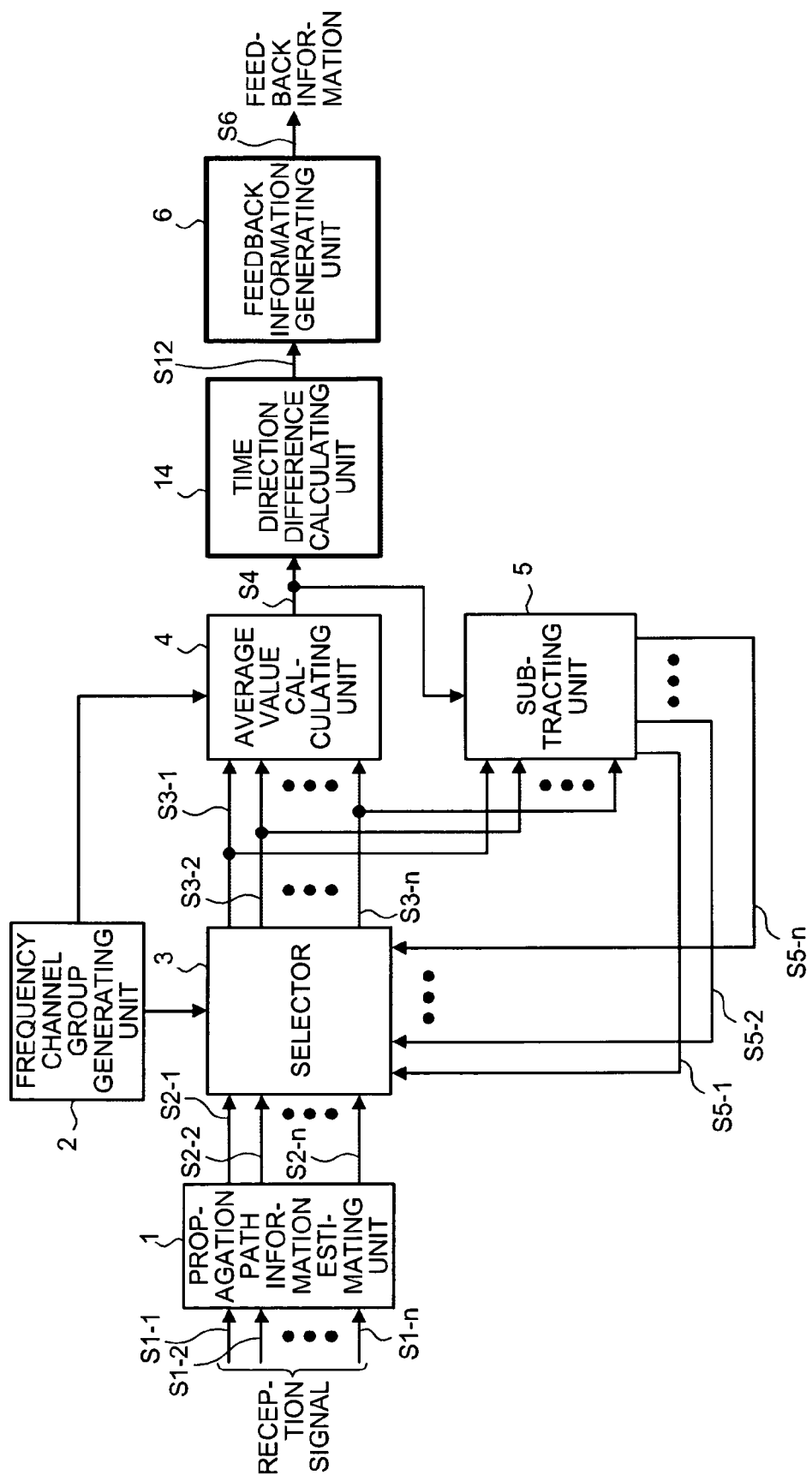
FIG. 10 is a view of a configuration example of a fifth embodiment of the communication apparatus according to the present invention.

FIG. 10 is a view of a configuration example of a fifth embodiment of the communication apparatus according to the present invention and a time direction difference calculating unit 14 is included that calculates a difference value S12 in the time direction in addition to the configuration of the first embodiment. The same reference numerals are added to the same constituent elements as FIG. 1 of the first embodiment and the description thereof will be omitted. The operation of the time direction difference calculating unit 14 different from the first embodiment will be described.

The characteristic operations of this embodiment will specifically be described with reference to the drawings. The time direction difference calculating unit 14 calculates a difference between a previous average value and a current average value for each average value of a group. The calculated difference value S12 is output to the feedback information generating unit 6. The information amount necessary for the feedback may further be reduced by using the time differences of the average values as the feedback information.

In this way, the differences of the average values are used as the feedback information in this embodiment of the present invention. Therefore, the feedback information amount may further be reduced and a higher-speed feedback loop can further be achieved.

Although the difference calculating process in the time direction is applied to the configuration of the first embodiment in this embodiment for convenience of description, this is not a limitation and the process can be applied to the configuration of the second or third embodiment.

Sixth Embodiment

Figure 11:
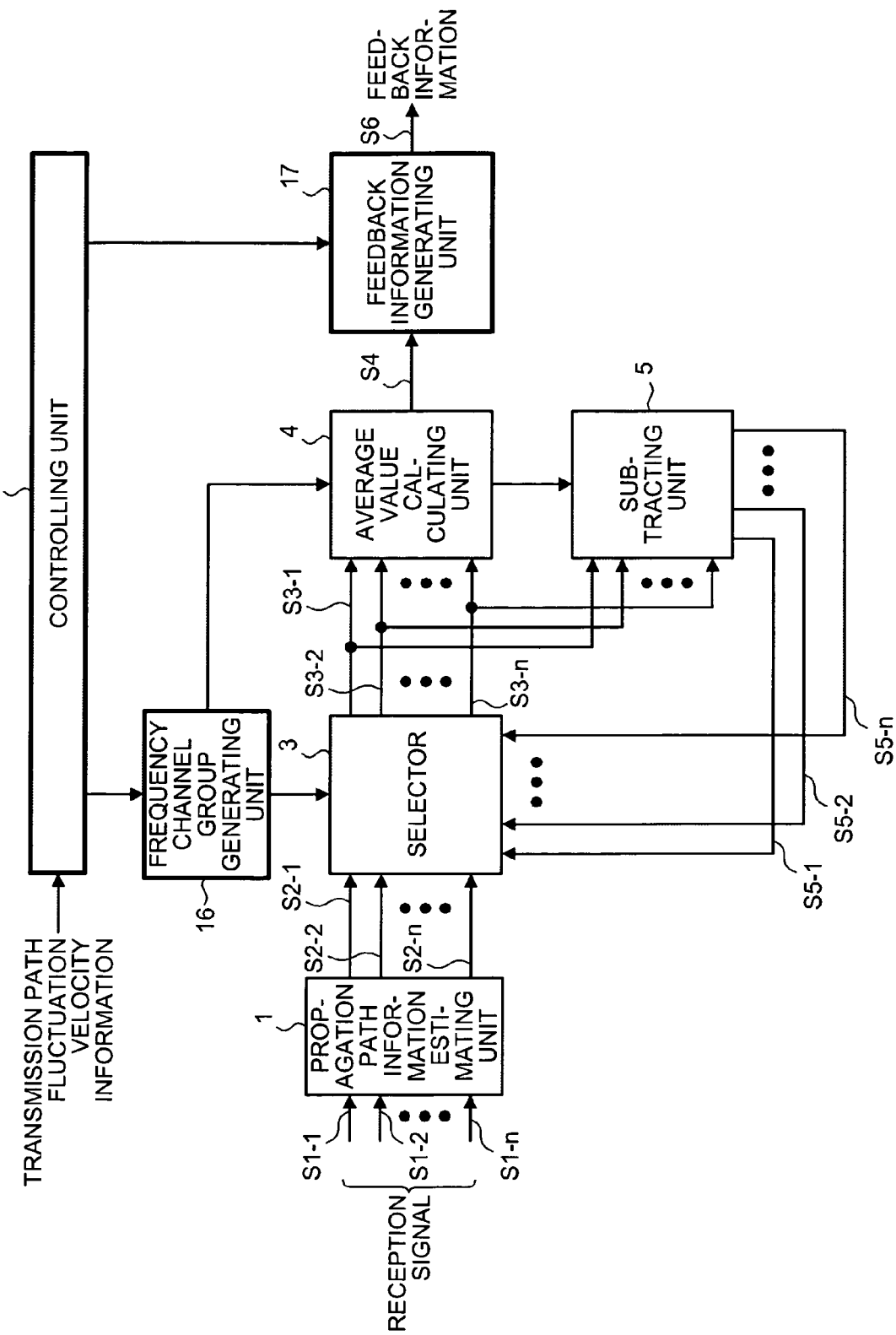
FIG. 11 is a view of a configuration example of a sixth embodiment of the communication apparatus according to the present invention.

FIG. 11 is a view of a configuration example of a sixth embodiment of the communication apparatus according to the present invention and a controlling unit 15 is included that controls a frequency channel group generating unit 16 and a feedback information generating unit 17 based on transmission path fluctuation velocity information. The same reference numerals are added to the same constituent elements as FIG. 1 of the first embodiment and the description thereof will be omitted. The operations of the controlling unit 15, the frequency channel group generating unit 16, and the feedback information generating unit 17 different from the first embodiment will be described.

The characteristic operations of this embodiment will specifically be described with reference to the drawings. The transmission path fluctuation velocity information is a signal indicating a velocity of time fluctuations of the transmission path and spread of multipath in the time direction. Specifically, utilizable information includes information related to time fluctuations of the transmission path such as a movement velocity and a Doppler shift frequency of a terminal, information indicating a state of a multipath transmission path such as a delay spread and a delay profile, and information indexing the above values.

The controlling unit 15 adaptively controls a method of dividing groups in each layer, the number of subcarriers included in each group, the number of layers, a feedback cycle (settable for each layer), a combination of subcarriers used for a process, etc., based on the transmission path fluctuation velocity information, which is an input signal. For example, if the time fluctuations of the transmission path are moderate, a time change is also moderate in the transmission path estimate values of the subcarriers and, therefore, a longer feedback cycle is used. As a result, the feedback information amount is reduced. In the opposite case, a shorter feedback cycle is used. As a result, the feedback control can be driven to follow the transmission path fluctuations. If the delay spread is small, fluctuations in the frequency direction is reduced, that is, a correlation between adjacent subcarriers becomes strong and, therefore, the number of subcarriers feeding back the transmission path information is reduced. Contrary, if the delay spread is large, the number of subcarriers feeding back the transmission path information is increased.

In this way, the controlling unit 15 selects an optimal feedback method depending on situations of the propagation paths in this embodiment. Therefore, the same effect as the first embodiment can be acquired, and the further reduction of the feedback information amount and the higher-speed feedback can be achieved.

Although the adaptive control by the controlling unit is applied to the configuration of the first embodiment in this embodiment for convenience of description, this is not a limitation and the control can be applied to the configuration of the second, third, or fourth embodiment. As a result, the further reduction of the feedback information amount and the higher-speed feedback can be achieved.

Seventh Embodiment

A configuration and operation of a seventh embodiment will be described. In this embodiment, the feedback information generating unit of the first to sixth embodiments changes the capability of an error correction code depending on which layer an input average value belongs to.

Figure 12:
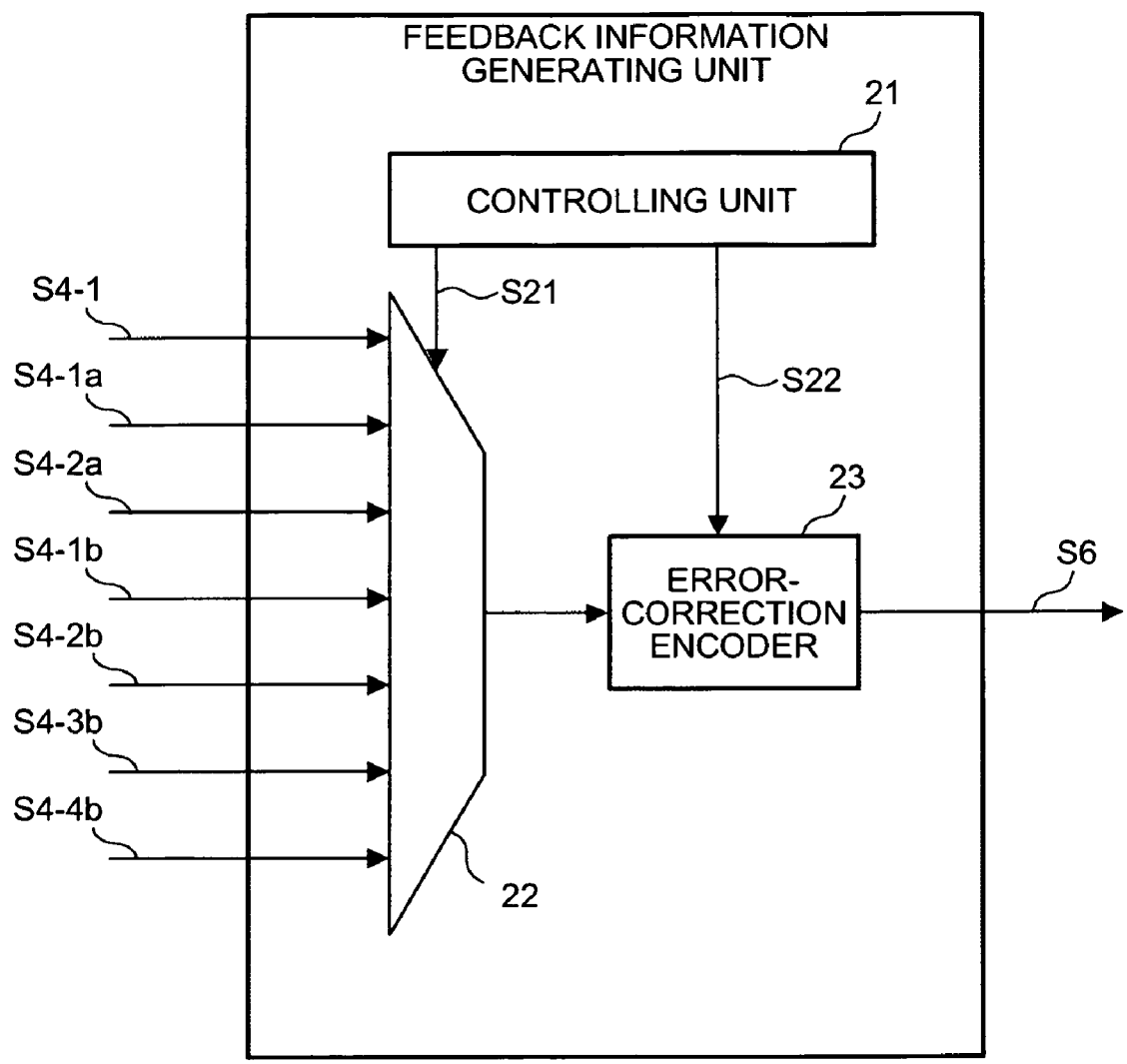
FIG. 12 is a view of a configuration example of the feedback information generating unit in the communication apparatus according to the present invention.

FIG. 12 is a view of a configuration example of the feedback information generating unit in the communication apparatus according to the present invention. This feedback information generating unit includes a controlling unit 21, a selector 22, and an error-correction encoder 23. S4-1 is an average value of the first group of the first layer; S4-1a is an average value of the first group of the second layer; S4-2a is an average value of the second group of the second layer; S4-1b is an average value of the first group of the third layer; S4-2b is an average value of the second group of the third layer; S4-3b is an average value of the third group of the third layer; S4-4b is an average value of the fourth group of the third layer; S21 is a selector control signal; and S22 is an error-correction encoder control signal. Although FIG. 12 shows a configuration when the number of layers is three (the number of subcarriers is four) for convenience of description, this is not a limitation.

The operation of the feedback information generating unit having the above configuration will then be described. The feedback information generating unit of this embodiment adaptively changes the capability of an error-correcting code depending on which layer an input average value belongs to. By performing encoding with a suitable correction capability depending on the layers, error robustness can be improved at the time of the feedback; the information amount necessary for the feedback can be reduced; and the feedback loop can be operated at a higher speed. For example, since the average value of the highest layer is related to the propagation path information estimate values of all the subcarriers, if this average value has an error at the time of the feedback, the error affects all the subcarriers. Therefore, in this embodiment, the encoding is performed with a higher error-correction capability for an average value of a higher layer. As a result, errors of average values can be reduced in a higher layer.

In this way, the feedback information generating unit of the embodiment performs the encoding with a suitable error-correction capability for each layer. Therefore, error robustness can be improved at the time of the feedback; the information amount necessary for the feedback can be reduced; and the feedback loop can be operated at a higher speed.

Eighth Embodiment

A configuration and operation of an eighth embodiment will be described. In this embodiment, a specific method of transmitting the feedback information generated by the feedback information generating unit of the first to seventh embodiments will be described.

Figure 13:
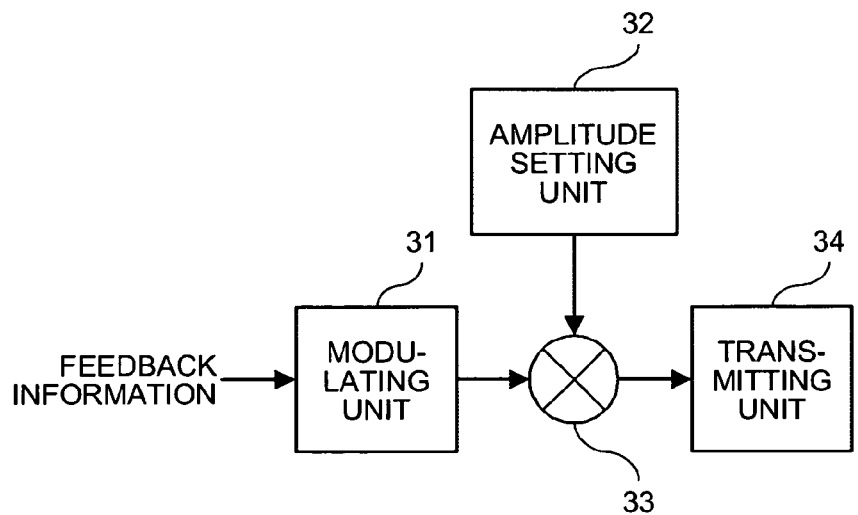
FIG. 13 is a view of a configuration example of a transmission processing unit in the communication apparatus according to the present invention.

FIG. 13 is a view of a configuration example of a transmission processing unit in the communication apparatus according to the present invention and a modulating unit 31, an amplitude setting unit 32, a multiplying unit 33, and a transmitting unit 34 are included. The modulating unit 31 performs predetermined modulation mapping for the feedback information output from the feedback information generating unit of the first to seventh embodiments and outputs the result to the multiplying unit 33. The amplitude setting unit 32 sets a weight when feedback transmission is performed for each piece of feedback information. The multiplying unit 33 multiplies the modulated signal by the weight output from the amplitude setting unit 32 and outputs the result to the transmitting unit 34. The transmitting unit 34 then executes a predetermined transmission processes (such as amplification, frequency conversion, and filtering) for the input signal to output the signal.

The amplitude setting unit 32 executes a transmission power increasing/decreasing process depending on importance of each piece of the feedback information. For example, since the propagation path information estimate values of a multiplicity of subcarriers are reconfigured from the average values of groups in a higher layer, it becomes more important not to mix an error into a higher layer at the time of the feedback. Therefore, in this embodiment, the amplitude setting unit 32 performs control such that the transmission power is increased for the feedback information of a higher layer while the transmission power is decreased for the feedback information of a lower layer.

In this way, the transmission power is suitably controlled for each layer in this embodiment. Since the error robustness of the feedback information is improved, the information amount necessary for the feedback can be reduced; the feedback loop can be operated at a higher speed; and therefore, quality improvement can be achieved in communication modes utilizing the feedback loop (such as transmission diversity and MIMO transmission).

Ninth Embodiment

A configuration and operation of a ninth embodiment will be described. In this embodiment, a specific method of transmitting the feedback information generated by the feedback information generating unit of the first to seventh embodiments will be described.

Figure 14:
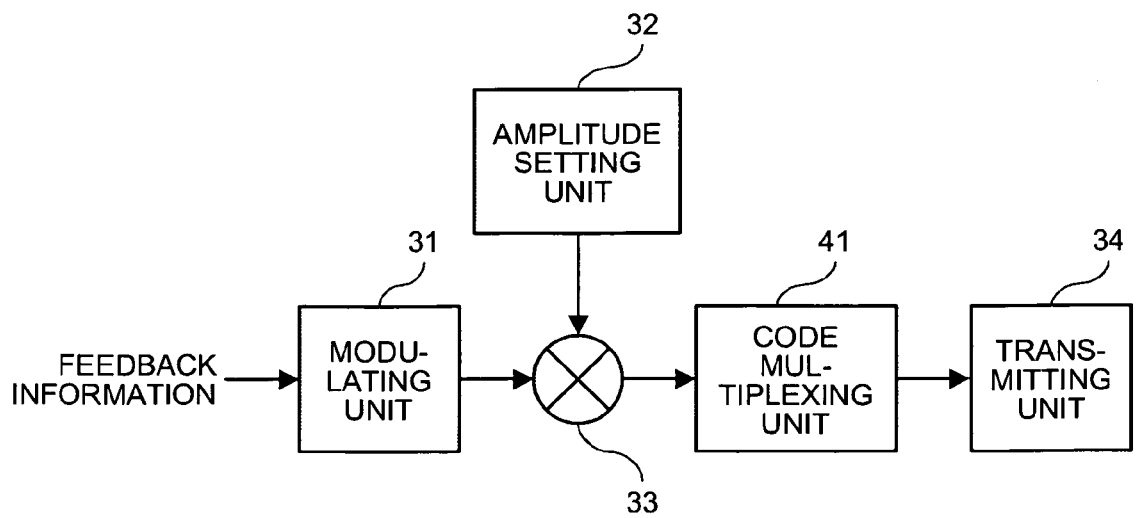
FIG. 14 is a view of a configuration example of the transmission processing unit in the communication apparatus according to the present invention.

FIG. 14 is a view of a configuration example of a transmission processing unit in the communication apparatus according to the present invention and a code multiplexing unit 41 is included in addition to the configuration of the eighth embodiment. The code multiplexing unit 41 will be described that operates differently from the eighth embodiment.

The code multiplexing unit 41 outputs to the transmitting unit 34 a result of multiplexing the feedback information corresponding to individual average values with spread codes. A spread rate of each piece of the feedback information may be the same, or a spread rate may be varied to control the error robustness of each piece of the feedback information.

In this way, the transmission power is controlled as is the case with the eighth embodiment and the spread rate is suitably controlled for each layer by the code multiplexing unit. Therefore, the error robustness of the feedback information is further improved, the information amount necessary for the feedback can be further reduced and the feedback loop can be operated at a higher speed.

Tenth Embodiment

Figure 15:
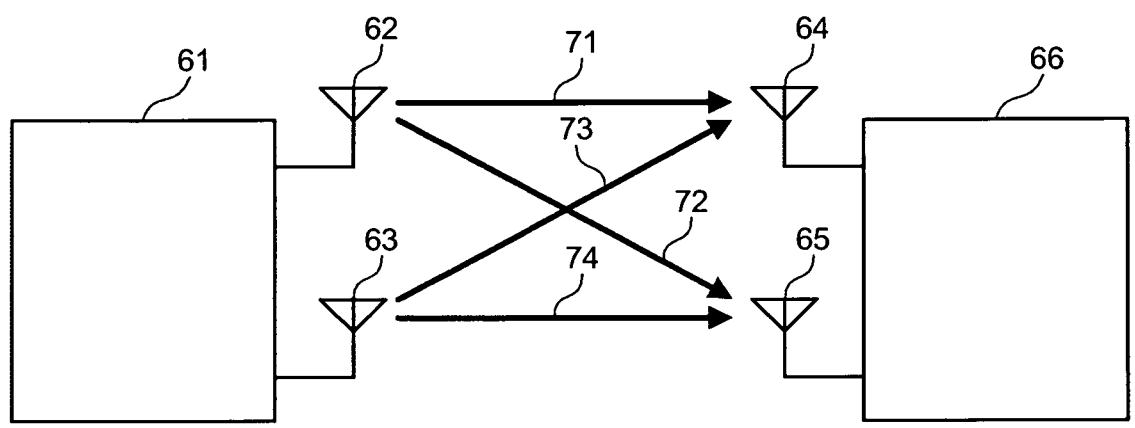
FIG. 15 is a view of a configuration example of a MIMO transmission/reception system.

FIG. 15 is a view of a configuration example of a MIMO transmission/reception system including the communication apparatus (corresponding to the communication apparatus of the first to ninth embodiments) according to the present invention. This MIMO transmission/reception system is configured by a transmitter 61 including transmission antennas 62 and 63, and a receiver 66 including reception antennas 64 and 65 as well as the functions of the first to ninth embodiments, and the apparatuses communicate through propagation paths 71, 72, 73, and 74. The propagation path 71 represents a propagation path between the transmission antenna 62 and the reception antenna 64; the propagation path 72 represents a propagation path between the transmission antenna 62 and the reception antenna 65; the propagation path 73 represents a propagation path between the transmission antenna 63 and the reception antenna 64; and the propagation path 74 represents a propagation path between the transmission antenna 63 and the reception antenna 65. Although FIG. 15 shows the MIMO transmission/reception system including two transmission antennas and two reception antennas, the numbers of the transmission antennas and the reception antennas are not limited to this value.

In this embodiment, for example, the function of the communication apparatus of the first embodiment can easily be expanded to the MIMO transmission/reception system by preparing the function of the communication apparatus of the first embodiment by the number of the propagation paths. That is, in the example of FIG. 15, the function of the communication apparatus of the first embodiment corresponding to the propagation paths 71, 72, 73, and 74 is included within the receiver 66.

Although the MIMO transmission/reception system is realized using the communication apparatus of the first embodiment by way of example in this embodiment, this is not a limitation, and the MIMO transmission/reception system may be realized by using the communication apparatus of other embodiments.

In this way, the MIMO transmission/reception system is configured by using the communication apparatus of the first to ninth embodiments. As a result, since the effect of reduction of the feedback information amount can easily be applied to the MIMO transmission/reception system, the feedback information amount can be reduced and the feedback loop can be operated at a higher speed especially when establishing a MIMO channel with a large number of propagation paths.

Eleventh Embodiment

In this embodiment, a feedback information amount reducing method will be described that is in the case of constructing the Eigen-beam MIMO transmission in the MIMO transmission/reception system of the tenth embodiment.

Figure 16:
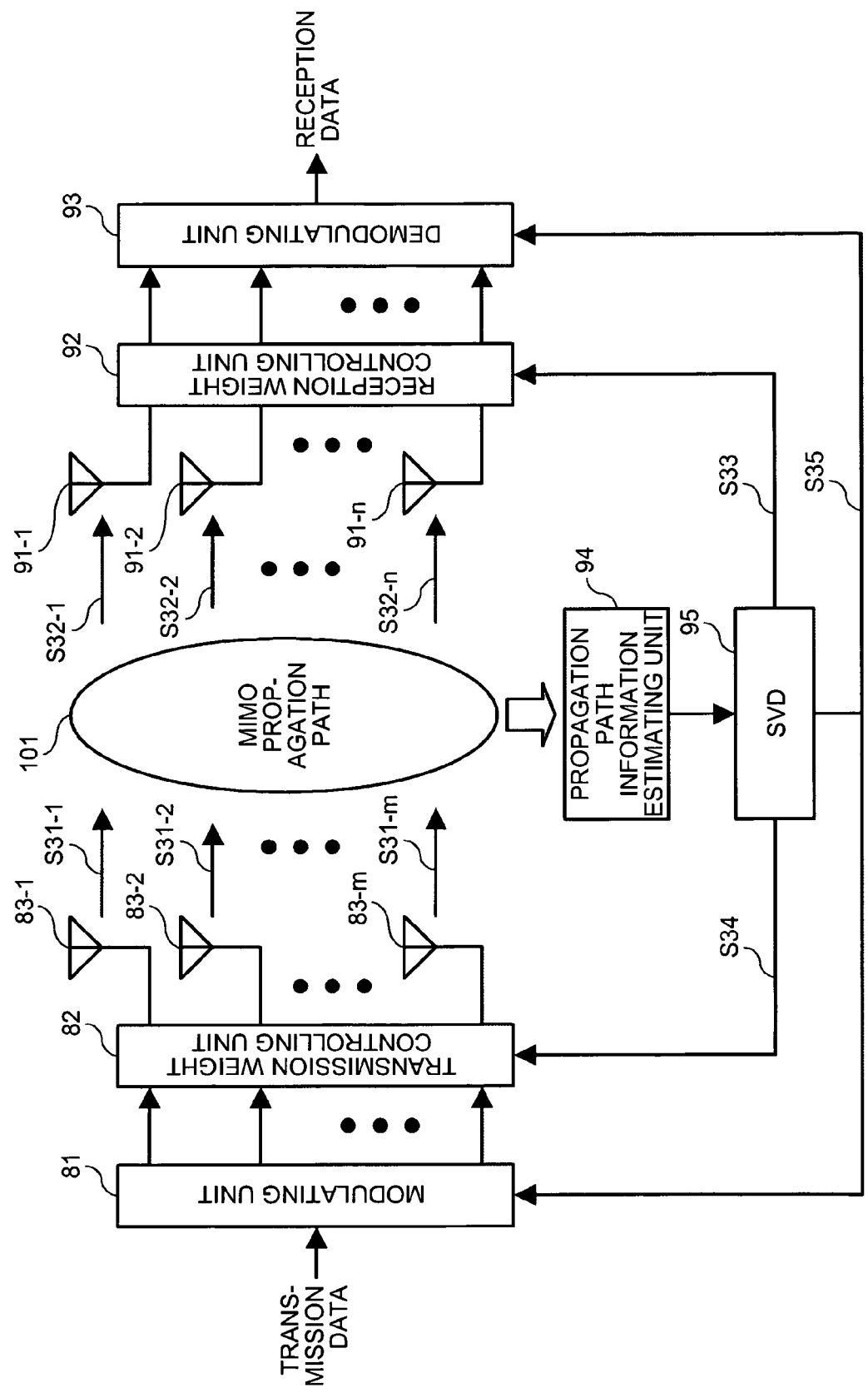
FIG. 16 is a view of a configuration example of an Eigenbeam MIMO transmission system.

FIG. 16 is a view of a configuration example of an Eigen-beam MIMO transmission system. In FIG. 16, the transmission communication apparatus includes a modulating unit 81, a transmission weight controlling unit 82, and transmission antennas 83-1 to 83m. The reception communication apparatus (the receiver 66 of the embodiment 10) includes reception antennas 91-1 to 91-n, a reception weight controlling unit 92, a demodulating unit 93, a propagation path information estimating unit 94 that uses the function of the first to ninth embodiment to feedback the propagation path information, and an SVD Singular Value Decomposition 95. S31-1 to S31-m are transmission signals; 101 is a MIMO transmission path; S32-1 to S32-n are reception signals; S33 is a left singular matrix; S34 is a right singular matrix; and S35 is a diagonal matrix. In this embodiment, the SVD 95 executes singular value decomposition for a matrix generated from channel response estimate values output from the propagation path information estimating unit 94 of the reception communication apparatus, and the resulting left singular matrix S33, right singular matrix S34, and diagonal matrix S35 are defined as the propagation path information estimate value.

In the Eigen-beam MIMO transmission of this embodiment, the propagation path information estimating unit 94 estimates the channel response of the MIMO propagation path 101 and forms a propagation path information estimate value matrix as a result. This matrix has a size of the number n of rows and the number m of columns. The SVD 95 executes singular value decomposition for this matrix to acquire the left singular matrix S33, the right singular matrix S34, and the diagonal matrix S35. The left singular matrix S33 determines the operation of the reception weight controlling unit 92 and the right singular matrix S34 determines the operation of the transmission weight controlling unit 82. The reception weight controlling unit 92 and the transmission weight controlling unit 82 operate to form a plurality of Eigen-beams between the transmission and reception sides. Since the diagonal matrix S35 represents quality of each Eigen-beam, each communication apparatus executes adaptive modulation/demodulation of each Eigen-beam based on the diagonal matrix S35.

For example, when applying the process of the first embodiment, the same process as FIG. 1 and the feedback are executed for each element of the right singular matrix S34 and the diagonal matrix S35 output from the SVD 95, which is defined as the propagation path information estimate value S2-1 to S2-n. The second to ninth embodiments can similarly be applied.

The important point is that knowledge about the MIMO propagation path must be shared between the transmission and reception sides in the Eigen-beam transmission. This means that the propagation path response or the SVD result must be fed back in the case of the FDD system. As the number m of the transmission antennas and the number n of the reception antennas are increased, the transmission capacity of the MIMO channel is increased and the information amount to be fed back is also increased. The above details are explicated in Sakaguchi, et al., "Initial Measurement on MIMO Eigenmode Communication System", the transactions of the Institute of Electronics, Information and Communication Engineers B, Vol. J87-B, No. 9.

For example, the communication apparatus shown in the first embodiment is applied to the Eigen-beam MIMO transmission system of FIG. 16 as follows. The number of pieces of the transmission path information to be estimated is a product of the number m of the transmission antennas and the number n of the reception antennas. Therefore, mn communication apparatuses shown in the first embodiment are prepared to calculate and feedback the feedback information for each piece of the transmission path information. Although the number of pieces of the transmission path information to be estimated is increased as values of the number m of the transmission antennas and the number n of the reception antennas are increased, since the feedback information amount can be reduced by applying the first embodiment, the feedback loop may be operated at high speed and the Eigen-beam MIMO transmission system may be driven to follow the propagation path fluctuations.

Since the feedback information amount can be reduced in the Eigen-beam MIMO transmission by the above process in this embodiment, the feedback can be performed at a higher speed, and a rate of control information can be reduced relative to the communication capacity. Therefore, the communication capacity may be increased.

INDUSTRIAL APPLICABILITY

As described above, the communication apparatus according to the present invention is useful for a radio communication system that performs multi-carrier transmission and is particularly suitable for a radio communication system that includes a reception communication apparatus feeding back propagation path information of frequency channels to a transmission communication apparatus.

The invention claimed is:

1. A communication apparatus that uses a plurality of frequency channels to perform multi-carrier transmission, the communication apparatus serving as a reception communication apparatus, comprising:
   a plurality of reception antennas;
   a grouping controlling unit that configures a plurality of layers including the plurality of frequency channels to perform control for hierarchically grouping the plurality of frequency channels so that the number of frequency channels included in a group of a layer becomes smaller than the number of frequency channels included in a group of a layer immediately above;
   a propagation path information estimating unit that estimates propagation path information of the plurality of frequency channels;
   an average value calculating unit that hierarchically groups the plurality of frequency channels under the control of the grouping controlling unit, the average value calculating unit calculating an average value of the propagation path information for each group in a highest layer with the use of propagation path information estimate values output from the propagation path information estimating unit, the average value calculating unit calculating propagation path information estimate values used in each layer based on an average value of a layer immediately above to calculate an average value of the propagation path information for each group in other layers with the use of the propagation path information estimate values of the each layer; and a feedback unit that feeds back an average value acquired in each group as feedback information to another communication apparatus serving as a transmission communication apparatus.

2. The communication apparatus according to claim 1, wherein the multi-carrier transmission is employed in an OFDM system.

3. The communication apparatus according to claim 1, wherein a channel response of each frequency channel is estimated as the propagation path information estimate value.

4. The communication apparatus according to claim 3, wherein when the channel responses of the frequency channels are estimated, the channel response estimate values are represented in polar coordinate.

5. The communication apparatus according to claim 1, wherein the feedback unit feeds back average values acquired in groups at a different feedback cycle for each group.

6. The communication apparatus according to claim 5, wherein the feedback unit uses longer feedback cycles in descending order of the number of frequency channels to be averaged.

7. The communication apparatus according to claim 5, wherein when a propagation path information estimate value used for a certain layer is calculated, the average value calculating unit uses an average value lastly fed back in a layer immediately above as the average value of the layer immediately above.

8. The communication apparatus according to claim 1, further comprising:
a selecting unit that selects a predetermined number of average values from average values acquired from respective groups of each layer, wherein
the feedback unit feeds back the average values selected by the selecting unit as the feedback information.

9. The communication apparatus according to claim 8, wherein the selecting unit selects the average values such that longer feedback cycles are used in descending order of the number of frequency channels to be averaged.

10. The communication apparatus according to claim 8, wherein when a propagation path information estimate value used for a certain layer is calculated, the average value calculating unit uses an average value lastly fed back in a layer immediately above as the average value of the layer immediately above.

11. The communication apparatus according to claim 1, further comprising:
a time direction averaging unit that averages the average values of each of the groups in the time direction, wherein
the feedback unit feeds back the average values averaged in the time direction by the time direction averaging unit as the feedback information.

12. The communication apparatus according to claim 11, wherein the time direction averaging unit includes one of an IIR filter, an FIR filter, and a filter using a moving average.

13. The communication apparatus according to claim 11, wherein the time direction averaging unit includes one of an IIR filter and an FIR filter, a tap coefficient and a tap length are being adaptively changed.

14. The communication apparatus according to claim 11, wherein the time direction averaging unit includes a filter using a moving average, a moving average length being adaptively changed.

15. The communication apparatus according to claim 1, further comprising:
a time direction difference calculating unit that calculates a difference between a previous average value and a current average value for each group, wherein
the feedback unit feeds back the difference of the average values calculated by the time direction difference calculating unit as the feedback information.

16. The communication apparatus according to claim 1, further comprising:
a controlling unit that adaptively controls the number of layers, a group configuration in each layer, and a feedback cycle.

17. The communication apparatus according to claim 1, wherein the feedback unit adaptively changes the capability of an error correction code for each group to feed back the feedback information encoded with the error correction code.

18. The communication apparatus according to claim 1, wherein the feedback unit controls transmission power for each layer.

19. The communication apparatus according to claim 1, wherein the feedback unit multiplexes the average value of each group with spread codes.

20. The communication apparatus according to claim 19, wherein a spread rate is set for each average value of the groups.

21. The communication apparatus according to claim 1, the grouping controlling unit, the propagation path information estimating unit, the average value calculating unit, and the feedback unit of are provided for each reception signal from a plurality of reception antennas.

22. A communication apparatus comprising:
a first propagation path information estimating unit that reconfigures a propagation path information estimate value of each frequency channel by a procedure opposite to an average value calculating process of an average value calculating unit of another communication apparatus serving as a reception communication apparatus, wherein
the reception communication apparatus comprises
a plurality of reception antennas;
a grouping controlling unit that configures a plurality of layers including the plurality of frequency channels to perform control for hierarchically grouping the plurality of frequency channels so that the number of frequency channels included in a group of a layer becomes smaller than the number of frequency channels included in a group of a layer immediately above;
a second propagation path information estimating unit that estimates propagation path information of the plurality of frequency channels;
the average value calculating unit that hierarchically groups the plurality of frequency channels under the control of the grouping controlling unit, the average value calculating unit calculating the average value of the propagation path information for each group in a highest layer with the use of propagation path information estimate values output from the second propagation path information estimating unit, and performs the average value calculating process that calculates an average value of the propagation path information for each group in the other layers with the use of propagation path information estimate values of the each layer and of an average value of a layer immediately above; and a feedback unit that feeds back an average value acquired in each group as feedback information to the communication apparatus serving as a transmission apparatus.

23. The communication apparatus according to claim 22, wherein on reconfiguring the propagation path information estimate value, when an average value of a certain frequency channel is not fed back to the communication apparatus, the propagation path information estimate value of the certain frequency channel is obtained by an interpolation process.

24. A radio communication system with a plurality of propagation paths for communication, the radio communication system comprising:

a transmitter having a plurality of transmission antennas; and a receiver having a plurality of reception antennas, wherein the receiver comprises a grouping controlling unit, a propagation path information estimating unit, an average value calculating unit, and a feedback unit for each reception signal from a plurality of reception antennas, the grouping controlling unit configures a plurality of layers including a plurality of frequency channels to perform control for hierarchically grouping the plurality of frequency channels so that the number of frequency channels included in a group of a layer becomes smaller than the number of frequency channels included in a group of a layer immediately above, the propagation path information estimating unit estimates propagation path information of the plurality of frequency channels, the average value calculating unit hierarchically groups the plurality of frequency channels under the control of the grouping controlling unit, the average value calculating unit calculating an average value of the propagation path information for each group in a highest layer with the use of the propagation path information estimate values, the average value calculating unit calculating the propagation path information estimate values used in each layer based on an average value of a layer immediately above to calculate an average value of the propagation path information for each group in other layers with the use of the propagation path information estimate values of the each layer, and the feedback unit feeds back an average value acquired in each group as feedback information to the transmitter.

25. The radio communication system according to claim 24, wherein the propagation path information estimating unit in the receiver estimates a channel response to form a propagation path information estimate value matrix as a result and defines propagation path information estimate values as each element of a left singular matrix, a right singular matrix, and a diagonal matrix acquired by executing singular value decomposition.

* * * * *